(12) United States Patent
Shao et al.

(10) Patent No.: US 11,777,575 B2
(45) Date of Patent: Oct. 3, 2023

(54) CSI REPORTING METHOD AND APPARATUS

(71) Applicant: HUAWEI TECHNOLOGIES CO., LTD., Guangdong (CN)

(72) Inventors: Jiafeng Shao, Beijing (CN); Yongxia Lyu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 418 days.

(21) Appl. No.: 17/170,391

(22) Filed: Feb. 8, 2021

(65) Prior Publication Data
US 2021/0167828 A1    Jun. 3, 2021

Related U.S. Application Data

(63) Continuation of application No. PCT/CN2019/099709, filed on Aug. 8, 2019.

(30) Foreign Application Priority Data

Aug. 10, 2018 (CN) .......................... 201810912190.2

(51) Int. Cl.
*H04W 56/00* (2009.01)
*H04B 7/06* (2006.01)
(Continued)

(52) U.S. Cl.
CPC ......... *H04B 7/0626* (2013.01); *H04L 1/0004* (2013.01); *H04L 1/1819* (2013.01);
(Continued)

(58) Field of Classification Search
CPC .... H04B 7/0626; H04W 76/11; H04W 72/23; H04W 72/0446; H04W 72/0466;
(Continued)

(56) References Cited

U.S. PATENT DOCUMENTS

| 2015/0139175 A1 | 5/2015 | Ratasuk et al. |
| 2018/0220423 A1 | 8/2018 | Ly et al. |

(Continued)

FOREIGN PATENT DOCUMENTS

| CN | 104519515 A | 4/2015 |
| CN | 104601286 A | 5/2015 |

(Continued)

OTHER PUBLICATIONS

Intel Corporation, "Remaining issues on CSI reporting," 3GPP TSG RAN WG1 #93, R1-1806506, Busan, South Korea, May 21-25, 2018, 11 pages.

(Continued)

*Primary Examiner* — Sai Ming Chan
(74) *Attorney, Agent, or Firm* — Fish & Richardson P.C.

(57) ABSTRACT

The present disclosure relates to channel state information (CSI) reporting methods and apparatus. When receiving first indication information used to trigger reporting of CSI, a terminal device determines a first time interval from a plurality of candidate first time intervals. The first time interval is used to determine whether the first indication information is valid. The terminal device reports the CSI based on the first time interval.

18 Claims, 5 Drawing Sheets

(51) Int. Cl.
*H04W 76/11* (2018.01)
*H04L 27/26* (2006.01)
*H04L 1/00* (2006.01)
*H04L 1/1812* (2023.01)
*H04W 72/0446* (2023.01)
*H04W 72/044* (2023.01)
*H04W 80/02* (2009.01)
*H04W 72/23* (2023.01)

(52) U.S. Cl.
CPC ... *H04L 27/26025* (2021.01); *H04W 72/0446* (2013.01); *H04W 72/0466* (2013.01); *H04W 72/23* (2023.01); *H04W 76/11* (2018.02); *H04W 80/02* (2013.01)

(58) Field of Classification Search
CPC ............. H04W 80/02; H04L 27/26025; H04L 1/0004; H04L 1/1819
See application file for complete search history.

(56) References Cited

U.S. PATENT DOCUMENTS

| | | | | |
|---|---|---|---|---|
| 2019/0165847 | A1* | 5/2019 | Kim | H04L 5/0078 |
| 2019/0207737 | A1* | 7/2019 | Babaei | H04L 5/0098 |
| 2019/0349034 | A1* | 11/2019 | Manolakos | H04W 80/02 |
| 2020/0403678 | A1* | 12/2020 | Shi | H04W 72/53 |
| 2020/0404690 | A1* | 12/2020 | Lee | H04L 5/001 |

FOREIGN PATENT DOCUMENTS

| | | |
|---|---|---|
| CN | 105850189 A | 8/2016 |
| CN | 105979597 A | 9/2016 |
| CN | 106376050 A | 2/2017 |
| CN | 106788931 A | 5/2017 |
| CN | 107846373 A | 3/2018 |
| CN | 108012329 A | 5/2018 |
| CN | 108173627 A | 6/2018 |
| EP | 3562056 A1 | 10/2019 |
| WO | 2018021815 A1 | 2/2018 |
| WO | 2018060816 A1 | 4/2018 |
| WO | 2018116910 A1 | 6/2018 |

OTHER PUBLICATIONS

3GPP TS 38.214 V15.1.0 (Mar. 2018), "3rd Generation Partnership Project; Technical Specification Group Radio Access Network; NR; Physical layer procedures for data (Release 15)," Mar. 2018, 77 pages.
Office Action in Chinese Application No. 201810912190.2, dated Jul. 29. 2020, 7 pages.
Search Report in Chinese Application No. 201810912190.2, dated Jul. 23, 2020, 3 pages.
Huawei et al., "CSI feedback enhancements for URLLC," 3GPP TSG RAN WG1 Meeting #93, R1-1806892, Busan, Korea, May 21-25, 2018, 5 pages.
Huawei et al., "CSI enhancements for URLLC," 3GPP TSG RAN WG1 Meeting #94, R1-1809343, Gothenburg, Sweden, Aug. 20-24, 2018, 5 pages.
3GPP TS 38.214 V15.2 0 (Jun. 2018), "3rd Generation Partnership Project; Technical Specification Group Radio Access Network; NR; Physical layer procedures for data (Release 15)," Jun. 2018, 94 pages.
Extended European Search Report in European Application No. 19847255.7, dated Jul. 27, 2021, 13 pages.

* cited by examiner

CSI REPORTING METHOD AND APPARATUS

CROSS-REFERENCE TO RELATED APPLICATIONS

This application is a continuation of International Application No. PCT/CN2019/099709, filed on Aug. 8, 2019, which claims priority to Chinese Patent Application No. 201810912190.2, filed on Aug. 10, 2018. The disclosures of the aforementioned applications are hereby incorporated by reference in their entireties.

TECHNICAL FIELD

This application relates to the communications field, and in particular, to a channel state information (CSI) reporting method and an apparatus.

BACKGROUND

In a communications system, a terminal device needs to periodically or aperiodically report CSI to a network device. The CSI may include at least one CSI report, which is used to indicate channel quality of a downlink channel. For example, the terminal device may obtain the at least one CSI report by measuring a downlink reference signal sent by the network device. The network device may allocate a corresponding downlink transmission resource to the terminal device based on the CSI reported by the terminal device. However, when the terminal device does not report CSI in time, the network device cannot obtain accurate information about current downlink channel quality, and therefore cannot accurately allocate a downlink resource. Consequently, resource utilization efficiency and communication efficiency are affected.

SUMMARY

This application provides a CSI reporting method and an apparatus, to improve communication efficiency.

According to a first aspect, a CSI reporting method is provided. The method may be executed by a terminal device, or may be executed by a chip in the terminal device. The method includes: receiving downlink control information (DCI) on a physical downlink control channel (PDCCH), where the DC includes first indication information, and the first indication information is used to trigger the terminal device to report CSI on a first uplink channel; and determining, based on the DCI and/or higher layer signaling, a first time interval from a plurality of candidate first time intervals corresponding to a first subcarrier spacing, where the first time interval is used to determine whether the first indication information is valid, the first subcarrier spacing is one of the following plurality of subcarrier spacings: a 15 kilohertz (kHz) subcarrier spacing, a 30 kHz subcarrier spacing, a 60 kHz subcarrier spacing, and a 120 kHz subcarrier spacing, and a correspondence between the first subcarrier spacing and the first time interval meets at least one of the following conditions: a first time interval corresponding to a 15 kHz subcarrier spacing is less than or equal to eight symbols, a first time interval corresponding to a 30 kHz subcarrier spacing is less than or equal to 12 symbols, a first time interval corresponding to a 60 kHz subcarrier spacing is less than or equal to 24 symbols, and a first time interval corresponding to a 120 kHz subcarrier spacing is less than or equal to 42 symbols.

In this embodiment of this application, the plurality of candidate first time intervals may be preconfigured or predefined for the first subcarrier spacing. The terminal device may select an appropriate first time interval from the plurality of candidate first time intervals based on the DCI and/or the higher layer signaling, and report the CSI based on the first time interval, so as to improve CSI reporting flexibility.

In a possible implementation, the method further includes: when a time interval between the last symbol of the PDCCH and the first symbol of the first uplink channel is greater than or equal to the first time interval, determining that the first indication information is valid; or when a time interval between the last symbol of the PDCCH and the first symbol of the first uplink channel is less than the first time interval, determining that the first indication information is invalid.

With reference to the first aspect, in a possible implementation, the first time interval meets the following condition: the first time interval is less than or equal to a time interval between the last symbol of a physical downlink shared channel (PDSCH) indicated by the DCI and the first symbol of a second uplink channel, where the second uplink channel is used to carry hybrid automatic repeat request (HARQ) feedback information corresponding to the PDSCH indicated by the DCI.

With reference to the first aspect, in a possible implementation, the first subcarrier spacing is a smallest value in a subcarrier spacing corresponding to a demodulation reference signal (DMRS) corresponding to the PDSCH indicated by the DCI, a subcarrier spacing corresponding to the PDCCH, and a subcarrier spacing corresponding to the first uplink channel; or the first subcarrier spacing is a smallest value in a subcarrier spacing corresponding to a channel state information reference signal (CSI-RS), a subcarrier spacing corresponding to a DMRS corresponding to the PDSCH indicated by the DCI, a subcarrier spacing corresponding to the PDCCH, and a subcarrier spacing corresponding to the first uplink channel.

With reference to the first aspect, in a possible implementation, the DCI includes at least one of the following information: a time interval between a slot in which the PDSCH indicated by the DCI is located and a slot in which the HARQ feedback information is located, a start symbol and/or a time length of a time domain resource of the PDSCH indicated by the DCI, a start symbol and/or a time length of a time domain resource of the first uplink channel, information about at least one CSI report, and information about a downlink reference signal, where the downlink reference signal is a measurement resource used to obtain the at least one CSI report.

With reference to the first aspect, in a possible implementation, the determining, based on the DCI and/or higher layer signaling, a first time interval from a plurality of candidate first time intervals corresponding to a first subcarrier spacing includes: determining the first time interval when at least one of the following conditions is met: a time interval between a slot in which the PDSCH indicated by the DCI is located and a slot in which the HARQ feedback information is located is less than or equal to a first threshold; a time length of a time domain resource of the PDSCH indicated by the DCI is less than or equal to a second threshold; and a time length of a time domain resource of the first uplink channel indicated by the DCI is less than or equal to a third threshold.

With reference to the first aspect, in a possible implementation, the determining, based on the DCI and/or higher layer signaling, a first time interval from a plurality of candidate first time intervals corresponding to a first subcarrier spacing includes: determining the first time interval when a radio network temporary identifier (RNTI) used to scramble the DCI is a first RNTI, where modulation and coding scheme (MCS) information in the DC scrambled by using the first RNTI corresponds to a first MCS table, and the first MCS table includes MCS information whose spectral efficiency is 0.0586.

With reference to the first aspect, in a possible implementation, the method further includes: receiving a downlink reference signal, where the downlink reference signal is a measurement resource used to obtain the CSI; and determining, based on the DC and/or the higher layer signaling, a second time interval from a plurality of candidate second time intervals corresponding to the first subcarrier spacing, where the second time interval is used to determine whether the first indication information is valid or whether the CSI is updated, and a correspondence between the first subcarrier spacing and the second time interval meets at least one of the following conditions: a second time interval corresponding to a 15 kHz subcarrier spacing is less than or equal to six symbols, a second time interval corresponding to a 30 kHz subcarrier spacing is less than or equal to 10 symbols, a second time interval corresponding to a 60 kHz subcarrier spacing is less than or equal to 20 symbols, and a second time interval corresponding to a 120 kHz subcarrier spacing is less than or equal to 35 symbols.

With reference to the first aspect, in a possible implementation, the method further includes: when a time interval between the last symbol on which the downlink reference signal is located and the first symbol of the first uplink channel is greater than or equal to the second time interval, and the time interval between the last symbol of the PDCCH and the first symbol of the first uplink channel is greater than or equal to the first time interval, determining that the first indication information is valid; or when a time interval between the last symbol on which the downlink reference signal is located and the first symbol of the first uplink channel is less than the second time interval, determining that the first indication information is invalid.

With reference to the first aspect, in a possible implementation, the method further includes: when a time interval between the last symbol on which the downlink reference signal is located and the first symbol of the first uplink channel is greater than or equal to the second time interval, determining to update the CSI; or when a time interval between the last symbol on which the downlink reference signal is located and the first symbol of the first uplink channel is less than the second time interval, determining not to update the CSI.

With reference to the first aspect, in a possible implementation, the second time interval meets the following condition: the second time interval is less than or equal to a time interval between the last symbol of a PDSCH indicated by the DCI and the first symbol of a second uplink channel, where the second uplink channel is used to carry HARQ feedback information corresponding to the PDSCH indicated by the DCI.

With reference to the first aspect, in a possible implementation, the determining, based on the DCI and/or the higher layer signaling, a second time interval from a plurality of candidate second time intervals corresponding to the first subcarrier spacing includes: determining the second time interval when at least one of the following conditions is met: a time interval between a slot in which the PDSCH indicated by the DCI is located and a slot in which the HARQ feedback information is located is less than or equal to a fourth threshold; a time length of a time domain resource of the PDSCH indicated by the DCI is less than or equal to a fifth threshold; and a time length of a time domain resource of the first uplink channel indicated by the DCI is less than or equal to a sixth threshold.

With reference to the first aspect, in a possible implementation, the determining, based on the DCI and/or the higher layer signaling, a second time interval from a plurality of candidate second time intervals corresponding to the first subcarrier spacing includes: determining the second time interval when an RNTI used to scramble the DCI is a first RNTI, where modulation and coding scheme MCS information in the DCI scrambled by using the first RNTI corresponds to a first MCS table, and the first MCS table includes MCS information whose spectral efficiency is 0.0586.

With reference to the first aspect, in a possible implementation, the CSI is aperiodic channel state information (A-CSI) or semi-persistent channel state information (SP-CSI).

With reference to the first aspect, in a possible implementation, the determining, based on the DCI and/or the higher layer signaling, a second time interval from a plurality of candidate second time intervals corresponding to the first subcarrier spacing includes: determining the second time interval if search space in which the DCI is located is user-dedicated search space.

With reference to the first aspect, in a possible implementation, the method further includes: sending first capability indication information to a network device, where the first capability indication information is used to indicate whether the terminal device supports a capability of the first time interval.

With reference to the first aspect, in a possible implementation, the method further includes: receiving configuration information, where the configuration information is used to configure that the terminal device can send the CSI by using the first time interval.

With reference to the first aspect, in a possible implementation, the method further includes: sending the CSI on the first uplink channel, including: sending the CSI and the HARQ feedback information on the first uplink channel, where the terminal device separately encodes the CSI and the HARQ feedback information, and maps the CSI before the HARQ feedback information.

With reference to the first aspect, in a possible implementation, the method further includes: sending second capability indication information to the network device, where the second capability indication information is used to indicate whether the terminal device supports a capability of the second time interval.

With reference to the first aspect, in a possible implementation, the method further includes: receiving configuration information, where the configuration information is used to configure that the terminal device can send the CSI by using the second time interval.

According to a second aspect, a CSI reporting method is provided. The method may be executed by a network device, or may be executed by a chip in the network device. The method includes: sending DCI to a terminal device on a PDCCH, where the DCI includes first indication information, the first indication information is used to trigger the terminal device to report CSI on a first uplink channel, and the DCI and/or higher layer signaling are/is used to indicate to determine a first time interval from a plurality of candidate first time intervals corresponding to a first subcarrier spacing, where the first time interval is used to determine whether the first indication information is valid, the first subcarrier spacing is one of the following plurality of subcarrier spacings: a 15 kHz subcarrier spacing, a 30 kHz subcarrier spacing, a 60 kHz subcarrier spacing, and a 120 kHz subcarrier spacing, and a correspondence between the first subcarrier spacing and the first time interval meets at least one of the following conditions: a first time interval corresponding to a 15 kHz subcarrier spacing is less than or equal to eight symbols, a first time interval corresponding to a 30 kHz subcarrier spacing is less than or equal to 12 symbols, a first time interval corresponding to a 60 kHz subcarrier spacing is less than or equal to 24 symbols, and a first time interval corresponding to a 120 kHz subcarrier spacing is less than or equal to 42 symbols; and receiving the CSI from the terminal device on the first uplink channel.

With reference to the second aspect, in a possible implementation, when a time interval between the last symbol of the PDCCH and the first symbol of the first uplink channel is greater than or equal to the first time interval, the first indication information is valid; or when a time interval between the last symbol of the PDCCH and the first symbol of the first uplink channel is less than the first time interval, the first indication information is invalid.

With reference to the second aspect, in a possible implementation, the method further includes: sending the higher layer signaling.

With reference to the second aspect, in a possible implementation, the first time interval meets the following condition: the first time interval is less than or equal to a time interval between the last symbol of a PDSCH indicated by the DCI and the first symbol of a second uplink channel, where the second uplink channel is used to carry HARQ feedback information corresponding to the PDSCH indicated by the DCI.

With reference to the second aspect, in a possible implementation, the first subcarrier spacing is a smallest value in a subcarrier spacing corresponding to a DMRS corresponding to the PDSCH indicated by the DCI, a subcarrier spacing corresponding to the PDCCH, and a subcarrier spacing corresponding to the first uplink channel; or the first subcarrier spacing is a smallest value in a subcarrier spacing corresponding to a CSI-RS, a subcarrier spacing corresponding to a DMRS corresponding to the PDSCH indicated by the DCI, a subcarrier spacing corresponding to the PDCCH, and a subcarrier spacing corresponding to the first uplink channel.

With reference to the second aspect, in a possible implementation, the method further includes: scrambling the DCI by using a first RNTI, where the first RNTI corresponds to the first time interval, MCS information in the DCI scrambled by using the first RNTI corresponds to a first MCS table, and the first MCS table includes MCS information whose spectral efficiency is 0.0586.

With reference to the second aspect, in a possible implementation, the method further includes: sending, by the network device, a downlink reference signal to the terminal device, where the downlink reference signal is a measurement resource used to obtain the CSI, and the DCI and/or the higher layer signaling are/is used to indicate to determine a second time interval from a plurality of candidate second time intervals corresponding to the first subcarrier spacing, where the second time interval is used to determine whether the first indication information is valid or whether the CSI is updated, and a correspondence between the first subcarrier spacing and the second time interval meets at least one of the following conditions: a second time interval corresponding to a 15 kHz subcarrier spacing is less than or equal to six symbols, a second time interval corresponding to a 30 kHz subcarrier spacing is less than or equal to 10 symbols, a second time interval corresponding to a 60 kHz subcarrier spacing is less than or equal to 20 symbols, and a second time interval corresponding to a 120 kHz subcarrier spacing is less than or equal to 35 symbols.

With reference to the second aspect, in a possible implementation, when a time interval between the last symbol on which the downlink reference signal is located and the first symbol of the first uplink channel is greater than or equal to the second time interval, and the time interval between the last symbol of the PDCCH and the first symbol of the first uplink channel is greater than or equal to the first time interval, the first indication information is valid; or when a time interval between the last symbol on which the downlink reference signal is located and the first symbol of the first uplink channel is less than the second time interval, the first indication information is invalid.

With reference to the second aspect, in a possible implementation, when a time interval between the last symbol on which the downlink reference signal is located and the first symbol of the first uplink channel is greater than or equal to the second time interval, the CSI is updated; or when a time interval between the last symbol on which the downlink reference signal is located and the first symbol of the first uplink channel is less than the second time interval, the CSI is not updated.

With reference to the second aspect, in a possible implementation, the second time interval is less than or equal to a time interval between the last symbol of a PDSCH indicated by the DCI and the first symbol of a second uplink channel, where the second uplink channel is used to carry HARQ feedback information corresponding to the PDSCH indicated by the DCI.

With reference to the second aspect, in a possible implementation, the method further includes: scrambling the DCI by using a first RNTI, where the first RNTI corresponds to the second time interval, MCS information in the DCI scrambled by using the first RNTI corresponds to a first MCS table, and the first MCS table includes MCS information whose spectral efficiency is 0.0586.

With reference to the second aspect, in a possible implementation, the CSI is A-CSI or SP-CSI.

With reference to the second aspect, in a possible implementation, the method further includes: receiving first capability indication information from the terminal device, where the first capability indication information is used to indicate whether the terminal device supports a capability of the first time interval.

With reference to the second aspect, in a possible implementation, the method further includes: sending configuration information to the terminal device, where the configuration information is used to configure that the terminal device can send the CSI by using the first time interval.

With reference to the second aspect, in a possible implementation, the method further includes: receiving second capability indication information from the terminal device, where the second capability indication information is used to indicate whether the terminal device supports a capability of the second time interval.

With reference to the second aspect, in a possible implementation, the method further includes: sending configuration information, where the configuration information is used to configure that the terminal device can send the CSI by using the second time interval.

According to a third aspect, a CSI reporting method is provided. The method may be executed by a terminal device, or may be executed by a chip in the terminal device. The following uses the terminal device as an example for description. The method includes: receiving, by the terminal device, a downlink reference signal, where the downlink reference signal is a measurement resource used to obtain CSI; and determining, by the terminal device, a second time interval from a plurality of candidate second time intervals corresponding to a first subcarrier spacing, where the second time interval is used to determine whether the CSI is valid or whether the CSI is updated, and a correspondence between the second time interval and the first subcarrier spacing meets at least one of the following conditions: a second time interval corresponding to a 15 kHz subcarrier spacing is less than or equal to six symbols, a second time interval corresponding to a 30 kHz subcarrier spacing is less than or equal to 10 symbols, a second time interval corresponding to a 60 kHz subcarrier spacing is less than or equal to 20 symbols, and a second time interval corresponding to a 120 kHz subcarrier spacing is less than or equal to 35 symbols.

In this embodiment of this application, the plurality of candidate second time intervals may be preconfigured or predefined for the first subcarrier spacing. The terminal device may select an appropriate second time interval from the plurality of candidate second time intervals, and report the CSI based on the second time interval, so as to improve CSI reporting flexibility.

With reference to the third aspect, in a possible implementation, the CSI is periodic channel state information (P-CSI).

According to a fourth aspect, a CSI reporting method is provided. The method may be executed by a network device, or may be executed by a chip in the network device. The following uses the network device as an example for description. The method includes: sending, by the network device, a downlink reference signal to a terminal device, where the downlink reference signal is a measurement resource used to obtain CSI; and receiving, by the network device, the CSI on a first uplink channel, where the CSI is sent based on a second time interval corresponding to a first subcarrier spacing, the second time interval is used to determine whether the CSI is valid or whether the CSI is updated, and a correspondence between the second time interval and the first subcarrier spacing meets at least one of the following conditions: a second time interval corresponding to a 15 kHz subcarrier spacing is less than or equal to six symbols, a second time interval corresponding to a 30 kHz subcarrier spacing is less than or equal to 10 symbols, a second time interval corresponding to a 60 kHz subcarrier spacing is less than or equal to 20 symbols, and a second time interval corresponding to a 120 kHz subcarrier spacing is less than or equal to 35 symbols.

According to a fifth aspect, a CSI reporting method is provided, including: receiving, by a terminal device, DCI on a PDCCH, where the DC includes first indication information, and the first indication information is used to trigger the terminal device to report CSI on a first uplink channel; and sending, by the terminal device, the CSI on the first uplink channel, where a time interval between the last symbol of the PDCCH and the first symbol of the first uplink channel is greater than or equal to a first time interval corresponding to a first subcarrier spacing, the first time interval is used to determine whether the first indication information is valid, and the first subcarrier spacing is a smallest value in a subcarrier spacing corresponding to a DMRS corresponding to a PDSCH indicated by the DCI, a subcarrier spacing corresponding to the PDCCH, and a subcarrier spacing corresponding to the first uplink channel; or the first subcarrier spacing is a smallest value in a subcarrier spacing corresponding to a CSI-RS, a subcarrier spacing corresponding to a DMRS corresponding to a PDSCH indicated by the DCI, a subcarrier spacing corresponding to the PDCCH, and a subcarrier spacing corresponding to the first uplink channel.

According to a sixth aspect, a CSI reporting method is provided, including: sending, by a network device, DCI on a PDCCH, where the DCI is used to trigger a terminal device to report CSI; and receiving, by the network device, the CSI from the terminal device on a first uplink channel, where a time interval between the last symbol of the PDCCH and the first symbol of the first uplink channel is greater than or equal to a first time interval corresponding to a first subcarrier spacing, the first time interval is used to determine whether the first indication information is valid, and the first subcarrier spacing is a smallest value in a subcarrier spacing corresponding to a DMRS corresponding to a PDSCH indicated by the DCI, a subcarrier spacing corresponding to the PDCCH, and a subcarrier spacing corresponding to the first uplink channel; or the first subcarrier spacing is a smallest value in a subcarrier spacing corresponding to a CSI-RS, a subcarrier spacing corresponding to a DMRS corresponding to a PDSCH indicated by the DCI, a subcarrier spacing corresponding to the PDCCH, and a subcarrier spacing corresponding to the first uplink channel.

According to a seventh aspect, a communications apparatus is provided. The communications apparatus has functions of implementing the terminal device in the foregoing method embodiments. The functions may be implemented by hardware, or may be implemented by hardware executing corresponding software. The hardware or the software includes one or more units corresponding to the foregoing functions.

According to an eighth aspect, a communications apparatus is provided. The communications apparatus has functions of implementing the network device in the foregoing method embodiments. The functions may be implemented by hardware, or may be implemented by hardware executing corresponding software. The hardware or the software includes one or more units corresponding to the foregoing functions.

According to a ninth aspect, a communications apparatus is provided. The communications apparatus may be the terminal device in the foregoing method embodiments, or may be a chip disposed in the terminal device. The communications apparatus includes a memory, a communications interface, and a processor. The memory is configured to store a computer program or an instruction. The processor is coupled to the memory and the communications interface. When the processor executes the computer program or the instruction, the communications apparatus is enabled to perform the method performed by the terminal device in the foregoing method embodiments.

According to a tenth aspect, a communications apparatus is provided. The communications apparatus may be the network device in the foregoing method embodiments, or may be a chip disposed in the network device. The communications apparatus includes a memory, a communications interface, and a processor. The memory is configured to store a computer program or an instruction. The processor is coupled to the memory and the communications interface. When the processor executes the computer program or the instruction, the communications apparatus is enabled to perform the method performed by the network device in the foregoing method embodiments.

According to an eleventh aspect, a computer program product is provided. The computer program product includes computer program code, and when the computer program code is run on a computer, the computer is enabled to perform the method performed by the terminal device in the foregoing aspects.

According to a twelfth aspect, a computer program product is provided. The computer program product includes computer program code, and when the computer program code is run on a computer, the computer is enabled to perform the method performed by the network device in the foregoing aspects.

According to a thirteenth aspect, this application provides a chip system. The chip system includes a processor, configured to implement functions of the terminal device in the method in the foregoing aspects, for example, receiving or processing data and/or information in the foregoing method. In a possible design, the chip system further includes a memory. The memory is configured to store a program instruction and/or data. The chip system may include a chip, or may include a chip and another discrete component.

According to a fourteenth aspect, this application provides a chip system. The chip system includes a processor, configured to implement functions of the network device in the method in the foregoing aspects, for example, receiving or processing data and/or information in the foregoing method. In a possible design, the chip system further includes a memory. The memory is configured to store a program instruction and/or data. The chip system may include a chip, or may include a chip and another discrete component.

According to a fifteenth aspect, this application provides a computer readable storage medium. The computer readable storage medium stores a computer program, and when the computer program is run, the method performed by the terminal device in the foregoing aspects is implemented.

According to a sixteenth aspect, this application provides a computer readable storage medium. The computer readable storage medium stores a computer program, and when the computer program is run, the method performed by the network device in the foregoing aspects is implemented.

DESCRIPTION OF EMBODIMENTS

The following describes technical solutions in this application with reference to the accompanying drawings.

The technical solutions in the embodiments of this application may be applied to various communications systems, for example, a long term evolution (LTE) system, a 5th generation (5G) mobile communications system or a new radio (NR) communications system, and a future mobile communications system.

A terminal device in the embodiments of this application may be user equipment, an access terminal, a subscriber unit, a subscriber station, a mobile station, a mobile console, a remote station, a remote terminal, a user terminal, a terminal, or a user apparatus. The terminal device may alternatively be a handheld device with a wireless communication function, a computing device, another processing device connected to a wireless modem, a vehicle-mounted device, a wearable device, or the like. This is not limited in the embodiments of this application.

A network device in the embodiments of this application may be a device configured to communicate with the terminal device. The network device may be a base station, may be an evolved NodeB (eNB or eNodeB) in an LTE system, or may be a radio controller in a cloud radio access network (CRAN) scenario. The network device may alternatively be a relay station, an access point, a vehicle-mounted device, a next generation NodeB (gNodeB) in a 5G network, or the like. This is not limited in the embodiments of this application.

In the embodiments of this application, the terminal device or the network device includes a hardware layer, an operating system layer running above the hardware layer, and an application layer running above the operating system layer. The hardware layer includes hardware such as a central processing unit (CPU), a memory management unit (MMU), and memory (also referred to as main memory). The operating system may be any one or more computer operating systems that implement service processing by using a process, for example, a Linux operating system, a Unix operating system, an Android operating system, an iOS operating system, or a Windows operating system. The application layer includes applications such as a browser, an address book, word processing software, and instant communications software. In addition, a specific structure of an execution body of a method according to the embodiments of this application is not specifically limited in the embodiments of this application, provided that a program that records code for the method provided in the embodiments of this application can be run to perform communication according to the method provided in the embodiments of this application. For example, the method provided in the embodiments of this application may be executed by a terminal device or a network device, or may be executed by a function module that is in the terminal device or the network device and that can invoke and execute the program, for example, a chip module.

Figure 1:
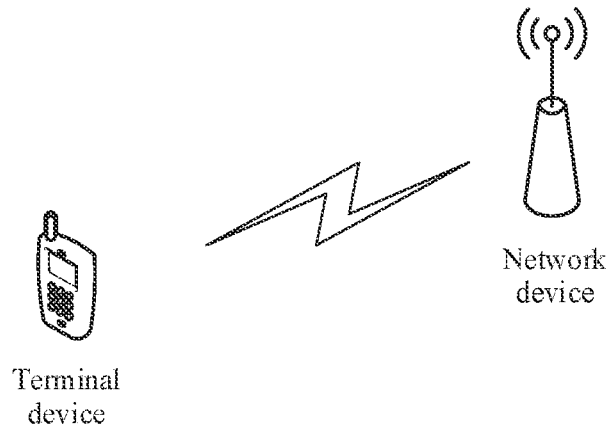
FIG. 1 is a schematic diagram of an application environment according to an embodiment of this application.

FIG. 1 is a schematic diagram of a possible application scenario according to an embodiment of this application. As shown in FIG. 1, the application scenario may include a terminal device and a network device. For specific descriptions of the terminal device and the network device, refer to the foregoing related descriptions. In an example, the terminal device may be a mobile terminal, and the network device may be an access network device. As shown in FIG. 1, the terminal device may access a network by using the network device, and the terminal device and the network device may communicate with each other by using a radio link.

Figure 2:
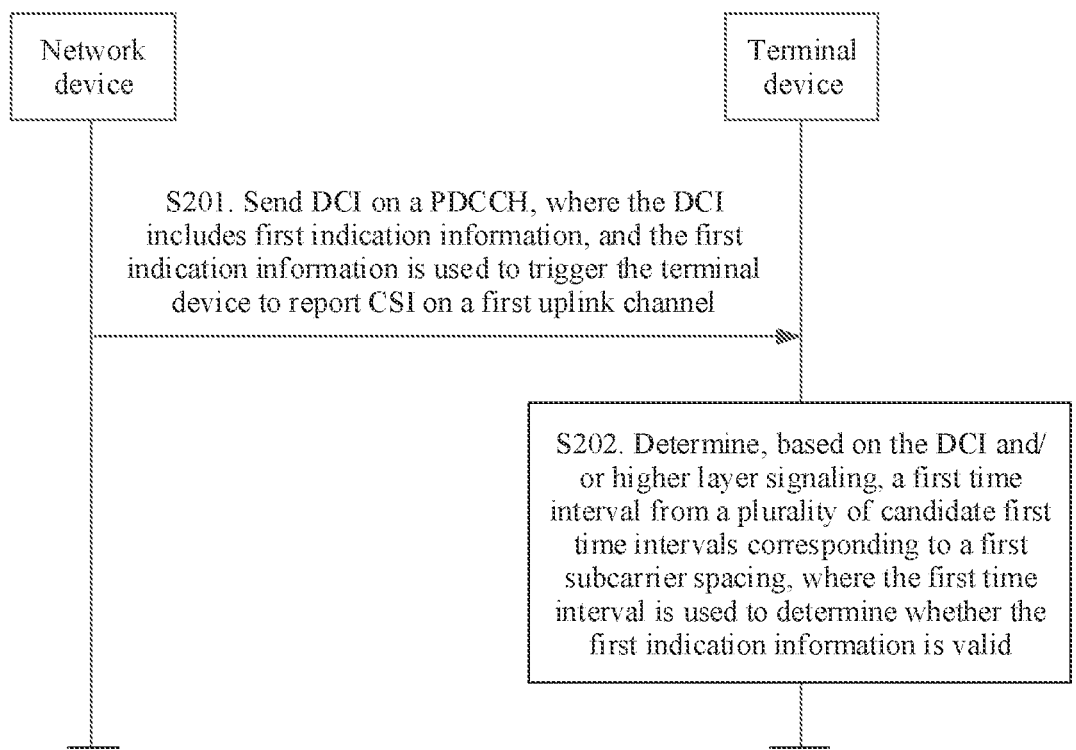
FIG. 2 is a schematic flowchart of a CSI reporting method according to an embodiment of this application.

FIG. 2 is a schematic flowchart of a CSI reporting method according to an embodiment of this application. The method in FIG. 2 may be performed by a terminal device and a network device, or may be performed by a chip in the terminal device and a chip in the network device. The following uses the terminal device and the network device as an example for description. The method in FIG. 2 includes the following steps.

S201. The network device sends DCI on a PDCCH, and correspondingly, the terminal device receives the DCI on the PDCCH, where the DCI includes first indication information, and the first indication information is used to trigger the terminal device to report CSI on a first uplink channel.

Optionally, the CSI may be periodic CSI, aperiodic CSI, or semi-persistent CSI. The P-CSI may be periodically reported by the terminal device to the network device. The A-CSI may be triggered by the network device by sending an activation command. The SP-CSI is also triggered by the network device by sending an activation command. After triggering activation, the terminal device may send the SP-CSI according to a preset rule, and stop sending the SP-CSI until receiving a deactivation command sent by the network device. The activation command may be the first indication information included in the DCI, or may be medium access control (MAC) signaling, or may be signaling of another type. This is not limited in this embodiment of this application.

Optionally, the CSI may include at least one CSI report, and the CSI report may be obtained based on a downlink reference signal sent by the network device. The downlink reference signal may be, for example, a demodulation reference signal (DMRS) or a channel state information reference signal (CSI-RS). This is not limited in this embodiment of this application.

S202. The terminal device determines, based on the DCI and/or higher layer signaling, a first time interval from a plurality of candidate first time intervals corresponding to a first subcarrier spacing, where the first time interval is used to determine whether the first indication information is valid, the first subcarrier spacing is one of the following plurality of subcarrier spacings: a 15 kHz subcarrier spacing, a 30 kHz subcarrier spacing, a 60 kHz subcarrier spacing, and a 120 kHz subcarrier spacing, and a correspondence between the first subcarrier spacing and the first time interval meets at least one of the following conditions: a first time interval corresponding to a 15 kHz subcarrier spacing is less than or equal to eight symbols, a first time interval corresponding to a 30 kHz subcarrier spacing is less than or equal to 12 symbols, a first time interval corresponding to a 60 kHz subcarrier spacing is less than or equal to 24 symbols, and a first time interval corresponding to a 120 kHz subcarrier spacing is less than or equal to 42 symbols.

Optionally, the first uplink channel may be an uplink control channel, or may be an uplink shared channel. For example, the first uplink channel may be a physical uplink control channel (PUCCH) or a physical uplink shared channel (PUSCH).

Optionally, the symbol is a time domain symbol. It may be understood that a communications system performs scheduling in a unit of a symbol. The communications system may support various time scheduling units. For example, time scheduling in a unit of a symbol is usually referred to as non-slot based scheduling, and a time length of the non-slot based scheduling may be one or more symbols. Time scheduling in a unit of a slot may be referred to as slot based scheduling.

Optionally, the symbol may be an orthogonal frequency division multiplexing (OFDM) symbol. The OFDM symbol may be generated through transform precoding. If transform precoding is used, the symbol may also be referred to as a single-carrier frequency division multiplexing (SC-FDM) symbol.

Optionally, the first time interval may represent a shortest time interval between the last symbol of the PDCCH carrying the DCI and the first symbol of the first uplink channel carrying the CSI triggered by the DCI, and the first time interval may be represented by using $Z_{(1)}$. Alternatively, the first time interval may be understood as a shortest time interval between a moment for "receiving the DCI" and a moment for "sending the CSI". In other words, the first time interval may be a time between a moment for "decoding the DCI" and a moment for "obtaining the uplink channel used to carry the CSI" by the terminal device. In other words, in an actual system, a time interval between the last symbol of the PDCCH carrying the DCI and the first symbol of the CSI triggered by sending the DCI needs to be greater than or equal to the first time interval. If the time interval is less than the first time interval, the terminal device may not report the CSI, or may ignore the DCI that is sent by the network device and that triggers the CSI, or may not send the uplink channel for the CSI triggered by the first indication information in the DCI.

In this embodiment of this application, the higher layer signaling may be signaling sent by a higher-layer protocol layer, and the higher-layer protocol layer is a protocol layer above a physical layer. The higher-layer protocol layer may specifically the following protocol layers: a medium access control (MAC) layer, a radio link control (RLC) layer, a packet data convergence protocol (PDCP) layer, a radio resource control (RRC) layer, and a non-access stratum (NAS).

In some examples, when a time interval between the last symbol of the PDCCH and the first symbol of the first uplink channel is greater than or equal to the first time interval, it is determined that the first indication information is valid, or when a time interval between the last symbol of the PDCCH and the first symbol of the first uplink channel is less than the first time interval, it is determined that the first indication information is invalid.

If the time interval between the last symbol of the PDCCH and the first symbol of the first uplink channel is greater than or equal to the first time interval, it indicates that the terminal device has sufficient time to send the CSI, and therefore the terminal device may determine that the first indication information is valid. If the time interval between the last symbol of the PDCCH and the first symbol of the first uplink channel is less than the first time interval, it indicates that the terminal device does not have sufficient time to send the CSI, and therefore the terminal device may determine that the first indication information is invalid.

In some examples, the method in FIG. 2 further includes: determining, based on the first time interval, whether to send the CSI on the first uplink channel. For example, if the terminal device determines, based on the first time interval, that the first indication information is valid, the terminal device sends, on the first uplink channel, the CSI triggered by the first indication information. If the terminal device determines, based on the first time interval, that the first indication information is invalid, the terminal device may not send the first uplink channel, or the terminal device may send the first uplink channel, but does not send, on the first uplink channel, the CSI triggered by the first indication information. In other words, the first uplink channel does not carry the CSI, or the terminal device may abandon sending the CSI or discard the DCI.

For example, the terminal device may determine whether the time interval between the last symbol of the PDCCH and the first symbol of the first uplink channel is greater than the first time interval. If the time interval is greater than the first time interval, the terminal device sends the CSI on the first uplink channel. If the time interval is less than the first time interval, the terminal device may not send the first uplink channel, or the terminal device may not send the CSI triggered by the first indication information.

Optionally, the method further includes: The terminal device sends the CSI on the first uplink channel, and correspondingly, the network device receives the CSI on the first uplink channel.

Optionally, a value of the first time interval meets at least one of the values shown in Table 1. In this embodiment of this application, X1, X2, X3, and X4 represent first time intervals corresponding to subcarrier spacings of 15 kHz, 30 kHz, 60 kHz, and 120 kHz. Details are not described below.

TABLE 1

| Subcarrier spacing (unit: kHz) | First time interval (unit: symbol) |
|---|---|
| 15 | X1 |
| 30 | X2 |
| 60 | X3 |
| 120 | X4 |

Optionally, X1, X2, X3, and X4 are positive numbers greater than 0, $X1 \leq 8$, $X2 \leq 12$, $X3 \leq 24$, and $X4 \leq 42$.

Optionally, $X1 \leq X2 \leq X3 \leq X4$.

For example, X1 may be one of the following: 1, 1.5, 2, 2.5, 3, 3.5, 4, 4.5, 5, 5.5, 6, 6.5, 7, 7.5, and 8.

For example, X2 may be one of the following: 1, 1.5, 2, 2.5, 3, 3.5, 4, 4.5, 5, 5.5, 6, 6.5, 7, 7.5, 8, 8.5, 9, 9.5, 10, 10.5, 11, 11.5, and 12.

For example, X3 may be one of the following: 3.5, 4, 4.5, 5, 5.5, 6, 6.5, 7, 7.5, 8, 8.5, 9, 9.5, 10, 10.5, 11, 11.5, 12, 12.5, 13, 13.5, 14, 14.5, 15, 15.5, 16, 16.5, 17, 17.5, 18, 18.5, 19, 19.5, 20, 20.5, 21, 21.5, 22, 22.5, 23, 23.5, and 24.

For example, X4 may be one of the following: 6.5, 7, 7.5, 8, 8.5, 9, 9.5, 10, 10.5, 11, 11.5, 12, 12.5, 13, 13.5, 14, 14.5, 15, 15.5, 16, 16.5, 17, 17.5, 18, 18.5, 19, 19.5, 20, 20.5, 21, 21.5, 22, 22.5, 23, 23.5, 24, 24.5, 25, 25.5, 26, 26.5, 27, 27.5, 28, 28.5, 29, 29.5, 30, 30.5, 31, 31.5, 32, 32.5, 33, 33.5, 34, 34.5, 35, 35.5, 36, 36.5, 37, 37.5, 38, 38.5, 39, 39.5, 40, 40.5, 41, 41.5, and 42.

Optionally, X1, X3, and X4 are positive integers, and X2 is a positive integer or a positive non-integer.

Optionally, the first time interval has a plurality of values. For example, X1, X2, X3, and X4 in Table 1 may meet at least one of the following conditions: $X1 \leq X2 \leq 5.2 \times X1$; $X2 \leq X3 \leq 2 \times X2$; and $X3 \leq X4 \leq 2 \times X3$. The foregoing formulas are used to indicate that a value range of X2 may be a closed interval between X1 and $2 \times X1$, a value range of X3 may be a closed interval between X2 and $2 \times X2$, and a value range of X4 may be a closed interval between X3 and $2 \times X3$.

In some other embodiments, X1, X2, X3, and X4 in Table 1 may meet at least one of the following conditions: $X1 \leq A \times 10$ or $A \times 9$; $X1 \leq B \times 13$, $X1 \leq C \times 25$; and $X1 \leq D \times 43$, where A, B, C, and D are positive numbers greater than 0 and less than or equal to 1.

In this embodiment of this application, the value of the first time interval is limited, so that the terminal device can report the CSI in time based on the first time interval. This helps the network device more accurately allocate a downlink resource, thereby increasing system resource utilization and improving communication efficiency.

In an example, the value of the first time interval may meet at least one of the following: $X1 \leq 10$, $X2 \leq 12$, $X3 \leq 23$, and $X4 \leq 36$.

In an example, the value of the first time interval may meet at least one of the following: $X1 \leq 3$, $X2 \leq 54.5$, and $X3 \leq 9$.

In an example, the value of the first time interval may meet at least one of the following: $X1 \leq 5$, $X2 \leq 5.5$, and $X3 \leq 11$.

In an example, the value of the first time interval may meet at least one of the values shown in Table 2.

TABLE 2

| Subcarrier spacing (unit: kHz) | First time interval (unit: symbol) |
|---|---|
| 15 | 5 |
| 30 | 7 |
| 60 | 13 |
| 120 | 22 |

It should be noted that, in this embodiment of this application, the subcarrier spacings of 15 kHz, 30 kHz, 60 kHz, and 120 kHz may alternatively be replaced with index numbers. For example, 0 represents the 15 kHz subcarrier spacing, 1 represents the 30 kHz subcarrier spacing, 2 represents the 60 kHz subcarrier spacing, and 3 represents the 120 kHz subcarrier spacing.

The plurality of candidate first time intervals may include the first time intervals shown in Table 1 and Table 2. Optionally, the plurality of candidate first time intervals may alternatively include the first time interval shown in Table 3, that is, the candidate first time intervals may include a candidate first time interval different from the first time interval limited in S202, or may be another candidate first time interval. This is not limited in this embodiment of this application. Optionally, in some embodiments, the terminal device may alternatively select the first time interval from Table 3 to report the CSI.

Optionally, some entries in Table 1 and Table 2 may be recombined to form a new table. The first time interval may be determined from the new table. The new table may include, for example, a part of Table 1 or Table 2, for example, one row, two rows, or three rows of content in Table 1, or one row, two rows, or three rows of content in Table 2. Alternatively, some entries in Table 1 or Table 2 are recombined. Alternatively, the new table may indicate a correspondence between each of some subcarrier spacings and the first time interval. For example, the some subcarrier spacings may be one or more of 15 kHz, 30 kHz, 60 kHz, and 120 kHz.

TABLE 3

| Subcarrier spacing (unit: kHz) | First time interval (unit: symbol) |
|---|---|
| 15 | 10 or 9 |
| 30 | 13 |
| 60 | 25 |
| 120 | 43 |

It should be noted that, in this embodiment of this application, the subcarrier spacing corresponding to the first time interval may include one or more of 15 kHz, 30 kHz, 60 kHz, and 120 kHz, or may include another subcarrier spacing, for example, 240 kHz. The first time intervals in Table 1 and Table 2 may be considered as relatively short first time intervals, and the first time interval in Table 3 may be considered as a relatively long first time interval. The relatively short first time interval may support only some subcarrier spacings. For example, the relatively short first time interval may support only subcarrier spacings of 15 kHz, 30 kHz, and 60 kHz, or the relatively short first time interval may support only subcarrier spacings of 30 kHz and 60 kHz, or the relatively short first time interval may support only subcarrier spacings of 15 kHz and 30 kHz. It may be understood that, in this case, another subcarrier spacing does not support a relatively short first time interval, and therefore a relatively long first time interval may be used for the another subcarrier spacing. For example, a value shown in Table 3 or a value greater than that in Table 3 may be used as the first time interval.

In some examples, the terminal device may support a plurality of types of services, for example, an enhanced mobile broadband (eMBB) service, an ultra-reliable low-latency communication (URLLC) service, and a massive machine-type communications (mMTC) service. The plurality of different types of services may include a latency-sensitive service such as the URLLC service, or may include a latency-insensitive service. Therefore, for different types of services, the terminal device does not need to always quickly report CSI. Therefore, the terminal device may determine an appropriate first time interval from the plurality of candidate first time intervals to report the CSI, to design a flexible CSI reporting method. In addition, by using a dynamic CSI notification method, when the terminal device does not need to feed back the CSI in time, calculation may be performed slowly, so as to save power of the terminal device and save hardware resources of the terminal device.

In this embodiment of this application, the plurality of candidate first time intervals may be preconfigured or predefined for the first subcarrier spacing. The terminal device may select an appropriate first time interval from the plurality of candidate first time intervals based on the DCI and/or the higher layer signaling, and determine, based on the first time interval, whether to report the CSI, so as to improve CSI reporting flexibility.

Optionally, the first subcarrier spacing may be used to determine a corresponding first time interval. For example, the corresponding first time interval may be determined from Table 1 to Table 3 based on the first subcarrier spacing.

It should be noted that a smaller subcarrier spacing indicates longer absolute duration corresponding to a first time interval corresponding to the subcarrier spacing, and therefore a lower requirement on a processing capability of the terminal device.

Optionally, when a DMRS is used as a downlink reference signal for obtaining the CSI, a subcarrier spacing corresponding to the DMRS may also be considered as a factor for determining the first subcarrier spacing. In some examples, the first subcarrier spacing is a smallest value in a subcarrier spacing corresponding to a DMRS corresponding to the PDSCH indicated by the DCI, a subcarrier spacing corresponding to the PDCCH, and a subcarrier spacing corresponding to the first uplink channel; or the first subcarrier spacing is a smallest value in a subcarrier spacing corresponding to a CSI-RS, a subcarrier spacing corresponding to a DMRS corresponding to the PDSCH indicated by the DCI, a subcarrier spacing corresponding to the PDCCH, and a subcarrier spacing corresponding to the first uplink channel.

In this embodiment of this application, the terminal device may use the DMRS as the downlink reference signal. The DMRS may be used for downlink data channel estimation, and may be further used to obtain the CSI. Therefore, resource utilization is increased, and communication efficiency is further improved.

Optionally, in some examples, the first time interval meets the following condition, the first time interval is less than or equal to a time interval between the last symbol of a PDSCH indicated by the DCI and the first symbol of a second uplink channel, where the second uplink channel is used to carry HARQ feedback information corresponding to the PDSCH indicated by the DCI. The first subcarrier spacing is any one of the following: a 15 kHz subcarrier spacing, a 30 kHz subcarrier spacing, a 60 kHz subcarrier spacing, and a 120 kHz subcarrier spacing.

If information in the PDSCH is correctly decoded, the HARQ feedback information may feed back an acknowledgement (ACK) signal. If information in the PDSCH is decoded incorrectly, the HARQ feedback information may feed back a negative acknowledgement (NACK) signal. The HARQ feedback information may include ACK and/or NACK information corresponding to a plurality of PDSCHs. After receiving a NACK signal, the network device may retransmit a PDSCH that is incorrectly decoded.

In this embodiment of this application, the first time interval is less than or equal to the time interval between the last symbol of the PDSCH indicated by the DCI and the first symbol of the second uplink channel, so that the network device can receive the CSI before the HARQ feedback information, and the network device can allocate, based on the CSI that is currently fed back, a downlink resource related to the HARQ feedback information. This helps the network device allocate a downlink resource based on the CSI that is reported in time, thereby increasing resource utilization.

Further, in some examples, the first time interval meets the following condition: the first time interval corresponding to the first subcarrier spacing is less than or equal to a third time interval corresponding to the first subcarrier spacing, where the third time interval is less than or equal to the time interval between the last symbol of the PDSCH indicated by the DCI and the first symbol of the second uplink channel.

In some examples, the third time interval may be a process time 1, and the process time 1 may be represented by using the following formula (1):

$$T_{proc,1} = ((N_1 + d_{1,1} + d_{1,2})(2048+144) \cdot \kappa 2^{-\mu}) \cdot T^C \quad (1)$$

Herein, $T_{proc,1}$ represents the process time 1.

A value of $N_1$ may be determined according to Table 4 and Table 5, and corresponding $N_1$ may be determined from Table 4 and Table 5 based on the first subcarrier spacing and different processing capabilities of the terminal device.

Herein, $d_{1,1}$ and $d_{1,2}$ are integers greater than or equal to 0. For example, $d_{1,1}$=0 or 1, and $d_{1,2}$=0, 1, 2, 3, 4, or 5.

A constant κ is 64.

$T_c$ represents a time unit, where $T_c=1/(\Delta f_{max} \cdot N_f)$, where $\Delta f_{max}=480 \cdot 10^3$ Hz, and $N_f=4096$.

Herein, μ represents a value corresponding to a subcarrier spacing. For example, 0 represents a 15 kHz subcarrier spacing, 1 represents a 30 kHz subcarrier spacing, 2 represents a 60 kHz subcarrier spacing, and 3 represents a 120 kHz subcarrier spacing.

Optionally, in an example, the value of $N_1$ may meet at least one of the values shown in Table 4 and Table 5. Table 4 and Table 5 show different PDSCH processing capabilities of the terminal device. Table 4 and Table 5 include a case in which there is an additional PDSCH demodulation reference signal configuration and a case in which there is no additional PDSCH demodulation reference signal configuration. The case in which there is an additional PDSCH demodulation reference signal configuration means that there may be a DMRS that occupies two inconsecutive symbols. The case in which there is no additional PDSCH demodulation reference signal configuration means that there is only a DMRS that occupies one or two consecutive symbols.

TABLE 4

| Subcarrier spacing (unit: kHz) | $N_1$ (unit: symbol) PDSCH processing capability 1 | |
|---|---|---|
| | No additional PDSCH demodulation reference signal configuration | Additional PDSCH demodulation reference signal configuration |
| 15 | 8 | 13 |
| 30 | 10 | 13 |
| 60 | 17 | 20 |
| 120 | 20 | 24 |

TABLE 5

| Subcarrier spacing (unit: kHz) | $N_1$ (unit: symbol) PDSCH processing capability 2 | |
|---|---|---|
| | No additional PDSCH demodulation reference signal configuration | Additional PDSCH demodulation reference signal configuration |
| 15 | 3 | 13 |
| 30 | 4.5 | 13 |
| 60 | 9 | 20 |

In some other examples, the third time interval may alternatively be $N_1$ in Table 4 and Table 5. Optionally, in some examples, $N_1$ may be understood as a shortest time interval between a moment for receiving the PDSCH and a moment for sending the HARQ feedback information corresponding to the PDSCH by the terminal device.

In some other examples, the first time interval meets the following condition: the first time interval corresponding to the first subcarrier spacing is less than or equal to a time interval between the last symbol of the PDCCH and the first symbol of a third uplink channel, where the third uplink channel is used to carry a PUSCH indicated by the DCI.

Further, in some examples, the first time interval meets the following condition; the first time interval corresponding to the first subcarrier spacing is less than or equal to a fourth time interval corresponding to the first subcarrier spacing, where the fourth time interval is less than or equal to a time interval between the last symbol of the PDCCH and the first symbol of a third uplink channel, and the third uplink channel is used to carry a PUSCH indicated by the DCI.

In some examples, the fourth time interval may be a process time 2, and the process time 2 may be represented by using the following formula (2):

$$T_{proc\_2}=\max(((N_2+d_{2,1}+d_{2,2})(2048+144) \cdot \kappa 2^{-\mu}) \cdot T_c, d_{2,3}) \quad (2)$$

Herein, $T_{proc\_2}$ represents the process time 2.

A value of $N_2$ may be determined according to Table 6 and Table 7, and corresponding $N_2$ may be determined from Table 6 and Table 7 based on the first subcarrier spacing and different processing capabilities of the terminal device.

Herein, $d_{1,1}$ and $d_{1,2}$ are integers greater than or equal to 0, and $d_{2,1}$ is a switching time in frequency domain transmission or 0. For example, $d_{2,1}$=0 or 1, and $d_{2,2}$=0 or 1.

A constant κ is 64.

$T_c$ represents a time unit, where $T_c=1/(\Delta f_{max} \cdot N_f)$, where $\Delta f_{max}=480 \cdot 10^3$ Hz, and $N_f=4096$.

Herein, μ represents a value corresponding to a subcarrier spacing. For example, 0 represents a 15 kHz subcarrier spacing, 1 represents a 30 kHz subcarrier spacing, 2 represents a 60 kHz subcarrier spacing, and 3 represents a 120 kHz subcarrier spacing.

Optionally, in an example, the value of $N_2$ may meet at least one of the values shown in Table 6 and Table 7. Table 6 and Table 7 show different PUSCH processing capabilities of the terminal device.

TABLE 6

| Subcarrier spacing (unit: kHz) | $N_2$ (unit: symbol) PUSCH processing capability 1 |
|---|---|
| 15 | 10 |
| 30 | 12 |
| 60 | 23 |
| 120 | 36 |

TABLE 7

| Subcarrier spacing (unit: kHz) | $N_2$ (unit: symbol) PUSCH processing capability 2 |
|---|---|
| 15 | 5 |
| 30 | 5.5 |
| 60 | 11 |

In some other examples, the fourth time interval may alternatively be $N_2$ in Table 6 and Table 7. Optionally, $N_2$ may be understood as a shortest interval between a moment for receiving the PDCCH and a moment for sending the third uplink channel by the terminal device.

Figure 3:
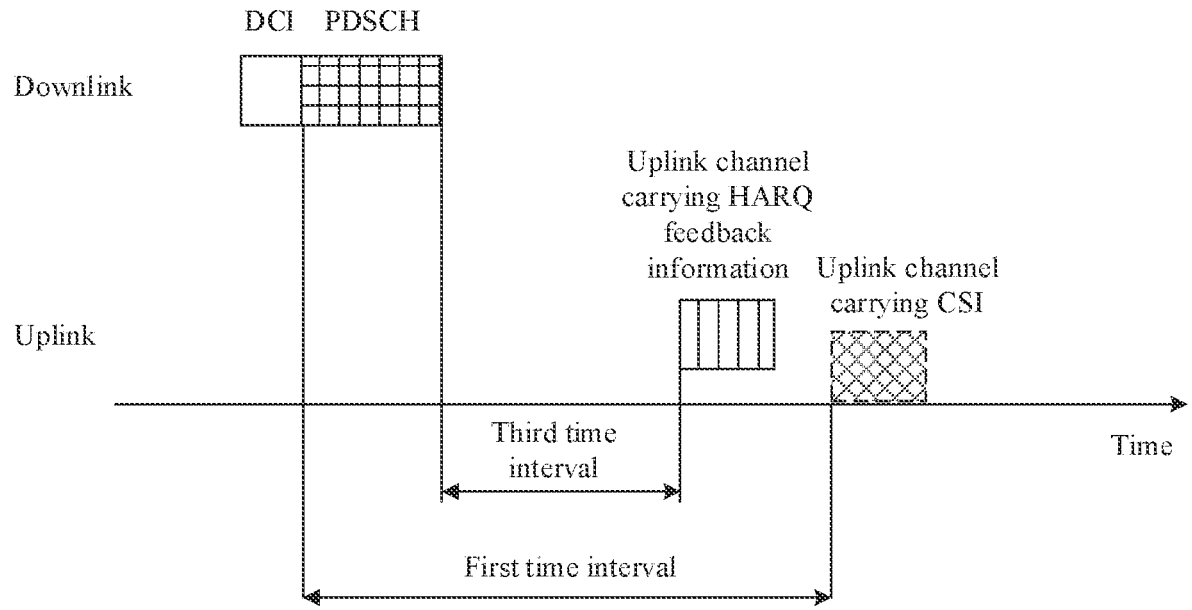
FIG. 3 is a schematic diagram of a scenario of CSI reporting according to an embodiment of this application.

FIG. 3 is a schematic diagram of a scenario of CSI sending according to an embodiment of this application. FIG. 3 is a schematic diagram of sending CSI and HARQ feedback information. As shown in FIG. 3, in a downlink transmission process, the network device may send DCI, and the DCI is used to indicate the network device to transmit downlink data on a PDSCH. The DCI may be further used to indicate a resource used by the terminal device to send the HARQ feedback information corresponding to the PDSCH. It can be learned from FIG. 3 that, if the third time interval is greater than or equal to the first time interval, that is, assuming that the network device receives the HARQ feedback information before the CSI, the following two cases exist. In a first case, after receiving the HARQ feedback information, the network device waits for a period of time to receive the CSI. After receiving the CSI, the network device retransmits the downlink data or transmits new downlink data based on the CSI. Although system efficiency can be improved because the accurate CSI is used, an extra latency is introduced, and consequently a latency-sensitive service such as a URLLC service is affected. In a second case, after receiving the HARQ feedback information, the network device immediately retransmits the downlink data or transmits new downlink data. However, because the network device does not wait for latest CSI, but uses the previous CSI, system transmission efficiency is affected because of the inaccurate information.

In this embodiment of this application, the first time interval corresponding to the first subcarrier spacing is less than or equal to the third time interval corresponding to the first subcarrier spacing. For example, the third time interval may be the process time 1 or $N_1$, so that the network device receives the CSI before the HARQ feedback information, and the network device can allocate, based on the CSI that is currently fed back, a downlink resource related to the HARQ feedback information. This helps the network device allocate a downlink resource based on the CSI that is reported in time, thereby improving resource allocation efficiency.

Optionally, in some examples, the DCI or the higher layer signaling may include at least one of the following information: a time interval between a slot in which the PDSCH indicated by the DCI is located and a slot in which the HARQ feedback information is located, a start symbol and/or a time length of a time domain resource of the PDSCH indicated by the DCI, a start symbol and/or a time length of a time domain resource of the first uplink channel, information about the at least one CSI report, and information about a downlink reference signal, where the downlink reference signal is a measurement resource used to obtain the at least one CSI report.

Alternatively, at least one of the foregoing information may be carried in the DCI or the higher layer signaling, or may be carried in another type of signaling. This is not limited in this embodiment of this application.

In this embodiment of this application, the DCI may include one or more of the foregoing information, so that the terminal device reports the CSI based on the information included in the DCI. This helps the terminal device flexibly report various types of CSI, thereby improving communication efficiency.

Optionally, the determining, based on the DCI and/or higher layer signaling, a first time interval from a plurality of candidate first time intervals corresponding to a first subcarrier spacing may include: directly indicating the first time interval by using the DCI and/or the higher layer signaling. For example, the DCI or the higher layer signaling may include indication information, and the indication information is used to indicate a first time interval corresponding to reporting of the CSI. The terminal device may directly determine, based on the indication information, the first time interval corresponding to reporting of the CSI. Alternatively, the protocol may predefine tables corresponding to the plurality of first time intervals, for example, Table 1 and Table 2. The network device notifies the terminal device of a subcarrier spacing by using the higher layer signaling. Further, the network device indicates, by using the DCI, the terminal to select one of the tables corresponding to the plurality of first time intervals.

Optionally, in some examples, the terminal device determines the first time interval when at least one of the following conditions is met: a time interval between a slot in which the PDSCH indicated by the DCI is located and a slot in which the HARQ feedback information is located is less than or equal to a first threshold: a time length of a time domain resource of the PDSCH indicated by the DCI is less than or equal to a second threshold; and a time length of a time domain resource of the first uplink channel is less than or equal to a third threshold.

Optionally, that the terminal device determines a first time interval may include: The terminal device determines to use a relatively short first time interval. For example, the terminal device determines to use the first time interval limited in S202, or determines to use the first time intervals shown in Table 1 and Table 2.

The first threshold to the third threshold are not limited in this embodiment of this application. The first threshold to the third threshold may be predefined, or may be configured by the network device for the terminal device by using the higher layer signaling, or may be obtained in another manner. The first threshold to the third threshold may be integers greater than or equal to 0. The terminal device may obtain, by using the DCI, the information used to determine the first time interval, or may obtain, in another manner, for example, by using the higher layer signaling, the information used to determine the first time interval. This is not limited in this embodiment of this application.

In this embodiment of this application, the terminal device may determine the first time interval based on at least one of the information included in the DCI or the higher layer signaling, or the terminal device determines, based on at least one of the plurality of pieces of information, to report the CSI based on the first time interval, thereby improving communication efficiency.

The following continues to describe, with reference to examples, various manners of determining the first time interval by the terminal device. In this embodiment of this application, the information for determining the first time interval may be indicated by the DCI, the higher layer signaling, or another type of signaling. In the following examples, that the information for determining the first time interval is indicated by the DCI is used as an example for description.

In a first manner, if the time interval between the slot in which the PDSCH indicated by the DCI is located and the slot in which the HARQ feedback information is located is less than or equal to the first threshold, it may be considered that the network device needs the terminal device to quickly report the HARQ feedback information. In other words, it may be considered that the currently transmitted service is relatively time-sensitive. Therefore, the CSI needs to be fed back by using a shorter first time interval, so as to improve system resource efficiency. It may be understood that the terminal device may determine the first time interval based on the time interval between the slot in which the PDSCH indicated by the DCI is located and the slot in which the HARQ feedback information is located. In an example, the DC may include first field information, to indicate the time interval between the slot in which the PDSCH is located and the slot in which the HARQ feedback information is located. For example, the slot in which the PDSCH is located is an n slot. If the first field information indicates k, it indicates that the slot in which the HARQ feedback information is located is an n+k slot. It may be understood that the time interval between the slot in which the PDSCH indicated by the DCI is located and the slot in which the HARQ feedback information is located may be a time interval between a start moment of the slot in which the PDSCH indicated by the DCI is located and a start moment of the slot in which the HARQ feedback information is located, or may be an index difference between a slot index of the slot in which the PDSCH indicated by the DCI is located and a slot index of the slot in which the HARQ feedback information is located. This is not limited in this application.

For example, if the time interval between the slot in which the PDSCH indicated by the DCI is located and the slot in which the HARQ feedback information is located is less than or equal to the first threshold, the terminal device determines the first time intervals in Table 1 and Table 2. If the time interval between the slot in which the PDSCH indicated by the DCI is located and the slot in which the HARQ feedback information is located is greater than the first threshold, the terminal device may determine another first time interval, and the another first time interval may be greater than the first time intervals in Table 1 and Table 2, for example, the first time interval in Table 3. In another example, if the terminal device uses the PDSCH processing capability 2 (referring to Table 5), and the first field information indicates that k is 0, the terminal device determines to report the CSI by using a relatively short first time interval, for example, the first time intervals in Table 1 and Table 2. In other words, when a PDSCH processing capability of the terminal device is relatively strong, a relatively short first time interval may be used.

In a second manner, if the time length of the time domain resource of the PDSCH indicated by the DCI is less than or equal to the second threshold, it may be considered that the network device needs the terminal device to quickly receive the PDSCH. Generally, an emergency service is a small-packet service, and can be quickly transmitted by using only a relatively short time domain resource. In other words, it may be considered that the currently transmitted service is relatively time-sensitive. Therefore, the CSI needs to be fed back by using a shorter first time interval, so as to help the network device allocate a resource based on the CSI, thereby improving system resource efficiency. In this scenario, the terminal device may determine the first time interval based on the time length of the time domain resource of the PDSCH indicated by the DCI. The time length of the time domain resource of the PDSCH may be determined based on PDSCH time domain indication information in the DCI, or may be determined in a predefined manner. For example, the DCI may include second field information, to indicate the time length of the time domain resource of the PDSCH indicated by the DCI. For example, the time length of the time domain resource of the PDSCH may be one of the following: 1, 2, 3, 4, 5, 6, 7, 8, 9, 10, 11, 12, 13, and 14.

For example, if the time length of the time domain resource of the PDSCH is less than or equal to the second threshold, the terminal device determines a relatively short first time interval, for example, the first time intervals in Table 1 and Table 2. If the time length of the time domain resource of the PDSCH is greater than the second threshold, the terminal device may determine another first time interval, and the another first time interval may be greater than the first time intervals in Table 1 and Table 2, for example, the first time interval in Table 3. For example, it is assumed that the second threshold is 7. If the time length of the time domain resource of the PDSCH is less than or equal to 7, the terminal device may determine the first time intervals in Table 1 and Table 2. If the time length of the time domain resource of the PDSCH is greater than 7, the terminal device may determine the first time interval in Table 3.

In a third manner, if the time length of the time domain resource of the first uplink channel is less than or equal to the third threshold, it may be considered that the network device needs the terminal device to quickly send the first uplink channel. In other words, it may be considered that the currently transmitted service is relatively time-sensitive. Therefore, the CSI needs to be fed back by using a shorter first time interval, so as to help the network device allocate a resource based on the CSI, thereby improving system resource efficiency. Optionally, the time length of the time domain resource of the first uplink channel may be determined based on at least one of the following information: a PDSCH to HARQ feedback timing indication, PUCCH resource indication information, PDSCH to HARQ feedback timing indication information, DCI to PUSCH sending timing indication information, and PUSCH resource indication information. The time length of the time domain resource of the first uplink channel may be determined based on information in the DCI, or may be predefined or determined by using the higher layer signaling. In an example, the time length of the time domain resource of the first uplink channel may be one of the following: 1, 2, 3, 4, 5, 6, 7, 8, 9, 10, 11, 12, 13, and 14.

For example, if the time length of the time domain resource of the first uplink channel is less than or equal to the third threshold, the terminal device determines to report the CSI by using the first time intervals in Table 1 and Table 2. If the time length of the time domain resource of the first uplink channel is greater than the third threshold, the terminal device may determine another first time interval, and the another first time interval may be greater than the first time intervals in Table 1 and Table 2, for example, the first time interval in Table 3. For example, if the third threshold is 2, and the time length of the time domain resource of the first uplink channel is less than or equal to 2, the terminal device determines the first time intervals in Table 1 and Table 2. If the time length of the time domain resource of the first uplink channel is greater than 2, the terminal device determines the first time interval in Table 3.

In a fourth manner, the terminal device may alternatively determine the first time interval based on the information about the CSI report. In some other examples, the terminal device may determine the first time interval based on the information about the CSI report and the information about the downlink reference signal.

The CSI triggered by the first indication information includes the one or more CSI reports. The information about the CSI report may include information indicating the first time interval. The information indicating the first time interval may be, for example, a table indicating the first time interval. The terminal device may determine that a first time interval indicated in the table is the first time interval corresponding to reporting of the CSI.

For example, the information about the CSI report may be used to indicate the first time interval corresponding to the one or more CSI reports, or indicate a correspondence between the first time interval corresponding to the one or more CSI reports and the subcarrier spacing. For example, the information about the CSI report may include any one of Table 1 to Table 3, or may include at least some entries in Table 1 to Table 3, or may include another table indicating the correspondence between the first time interval and the subcarrier spacing. The terminal device may determine the first time interval based on the information about the CSI report.

Optionally, the information about the CSI report may include a table of a first time interval corresponding to each CSI report included in the CSI. If the CSI reports indicate a plurality of first time intervals corresponding to the plurality of CSI reports, it may be determined that a longest first time interval is the first time interval corresponding to reporting of the CSI.

Optionally, the terminal device may alternatively determine the first time interval based on the information about the downlink reference signal. For example, the information about the downlink reference signal may indicate type information or other feature information of the downlink reference signal. For example, if the type information of the downlink reference signal that is indicated by the information about the downlink reference signal includes only the DMRS, the terminal device may determine to report the CSI by using the first time intervals in Table 1 and Table 2. If the type information of the downlink reference signal that is indicated by the information about the downlink reference signal includes the CSI-RS, the terminal device may determine to report the CSI by using the first time interval in Table 3.

Optionally, the network device may send the information about the CSI report to the terminal device. The information about the CSI report may be carried in the DCI, or may be carried in another type of message. The information about the CSI report may be understood as configuration information used to indicate the CSI report or other feature information of the CSI report.

In a fifth manner, the terminal device may determine the first time interval when a radio network temporary identifier (RNTI) used to scramble the DCI is a first RNTI, where MCS information in the DCI scrambled by using the first RNTI corresponds to a first MCS table, the first MCS table includes MCS information whose spectral efficiency is 0.0586. In this case, the terminal device may determine a relatively short first time interval, for example, the first time intervals in Table 1 and Table 2.

Optionally, the first time interval may be indicated to the terminal device by using another RNTI.

In this embodiment of this application, the terminal device may determine the first time interval based on a type of an RNTI used to scramble the DCI. In other words, the type of the RNTI used to scramble the DCI may implicitly indicate the first time interval, thereby improving communication efficiency.

The first MCS table may be Table 8 or Table 9. It can be learned that an MCS index corresponding to the spectral efficiency 0.0586 in Table 8 or Table 9 is 0. The foregoing is merely an example. In another example, the included MCS information whose spectral efficiency is 0.0586 may be represented in another form. This is not limited in this embodiment of this application.

In some examples, according to the higher layer signaling, a value of q in Table 9 may be 1 or 2. The first RNTI may be referred to as a modulation and coding scheme cell radio network temporary identifier (MCS-C-RNTI), or may have another identifier name. This is not limited in this application. The MCS-C-RNTI may indicate lower spectral efficiency, that is, the MCS-C-RNTI may be applied to highly reliable transmission. Therefore, the DCI scrambled by using the first RNTI may implicitly notify the terminal device that the CSI triggered by the DCI is important or urgent, and therefore the CSI needs to be sent based on a shorter first time interval, for example the first time intervals in Table 1 and Table 2.

TABLE 8

| MCS index $I_{MCS}$ | Modulation order $Q_m$ | Target encoding rate Rx[1024] | Spectrum efficiency |
|---|---|---|---|
| 0 | 2 | 30 | 0.0586 |
| 1 | 2 | 40 | 0.0781 |
| 2 | 2 | 50 | 0.0977 |
| 3 | 2 | 64 | 0.1250 |
| 4 | 2 | 78 | 0.1523 |
| 5 | 2 | 99 | 0.1934 |
| 6 | 2 | 120 | 0.2344 |
| 7 | 2 | 157 | 0.3066 |
| 8 | 2 | 193 | 0.3770 |
| 9 | 2 | 251 | 0.4902 |
| 10 | 2 | 308 | 0.6016 |
| 11 | 2 | 379 | 0.7402 |
| 12 | 2 | 449 | 0.8770 |
| 13 | 2 | 526 | 1.0273 |
| 14 | 2 | 602 | 1.1758 |
| 15 | 4 | 340 | 1.3281 |
| 16 | 4 | 378 | 1.4766 |
| 17 | 4 | 434 | 1.6953 |
| 18 | 4 | 490 | 1.9141 |
| 19 | 4 | 553 | 2.1602 |
| 20 | 4 | 616 | 2.4063 |
| 21 | 6 | 438 | 2.5664 |
| 22 | 6 | 466 | 2,7305 |
| 23 | 6 | 517 | 3.0293 |
| 24 | 6 | 567 | 3.3223 |
| 25 | 6 | 616 | 3.6094 |
| 26 | 6 | 666 | 3.9023 |
| 27 | 6 | 719 | 4.2129 |
| 28 | 6 | 772 | 4.5234 |
| 29 | 2 | Reserved | |
| 30 | 4 | Reserved | |
| 31 | 6 | Reserved | |

TABLE 9

| MCS index $I_{MCS}$ | Modulation order $Q_m$ | Target encoding rate Rx[1024] | Spectrum efficiency |
|---|---|---|---|
| 0 | q | 60/q | 0.0586 |
| 1 | q | 80/q | 0.0781 |
| 2 | q | 100/q | 0.0977 |
| 3 | q | 128/q | 0.1250 |
| 4 | q | 156/q | 0.1523 |
| 5 | q | 198/q | 0.1934 |
| 6 | 2 | 120 | 0.2344 |
| 7 | 2 | 157 | 0.3066 |
| 8 | 2 | 193 | 0.3770 |
| 9 | 2 | 251 | 0.4902 |
| 10 | 2 | 308 | 0.6016 |
| 11 | 2 | 379 | 0.7402 |
| 12 | 2 | 449 | 0.8770 |
| 13 | 2 | 526 | 1.0273 |
| 14 | 2 | 602 | 1.1758 |
| 15 | 2 | 679 | 1.3262 |
| 16 | 4 | 378 | 1.4766 |
| 17 | 4 | 434 | 1.6953 |
| 18 | 4 | 490 | 1.9141 |
| 19 | 4 | 553 | 2.1602 |
| 20 | 4 | 616 | 2.4063 |
| 21 | 4 | 658 | 2.5703 |
| 22 | 4 | 699 | 2.7305 |
| 23 | 4 | 772 | 3.0156 |
| 24 | 6 | 567 | 3.3223 |
| 25 | 6 | 616 | 3.6094 |
| 26 | 6 | 666 | 3.9023 |
| 27 | 6 | 772 | 4.5234 |
| 28 | q | Reserved | |
| 79 | 2 | Reserved | |
| 30 | 4 | Reserved | |
| 31 | 6 | Reserved | |

In a sixth manner, when learning of service reliability, the terminal device may alternatively determine the first time interval based on the service reliability. For example, if a service corresponding to the terminal device needs a block error rate (BLER) less than 0.00001, it may be considered that the DCI implicitly notifies the terminal device that the CSI triggered by the DCI is important or urgent, and therefore the CSI needs to be sent based on a shorter first time interval, for example, the first time intervals in Table 1 and Table 2.

In a seventh manner, the terminal device may determine the first time interval if search space in which the DCI is located is user-dedicated search space. In other words, the search space in which the DCI is located may implicitly indicate the first time interval. For example, if the search space in which the DCI is located is user-dedicated search space, the terminal device determines to report the CSI by using the first time intervals in Table 1 and Table 2. If the search space in which the DCI is located is common search space, the terminal device may determine another first time interval, and the another first time interval may be greater than the first time intervals in Table 1 and Table 2, for example, the first time interval in Table 3.

It may be understood that the first manner to the seventh manner each may be used to determine the first time interval, or two or more manners thereof may be used to jointly determine the first time interval.

Optionally, the terminal device may send first capability indication information to the network device, where the first capability indication information is used to indicate whether the terminal device supports a capability of the first time interval. For example, the terminal device may report, to the network device, that the terminal device supports some or all of the first time intervals in Table 1 and Table 2, or report, to the network device, that the terminal device does not support some or all of the first time intervals in Table 1 and Table 2.

In this embodiment of this application, the terminal device reports, to the network device, a capability of supporting or not supporting the first time interval, so that the network device allocates a resource to the terminal device based on the reported capability of supporting the first time interval, thereby improving communication efficiency.

Optionally, the terminal device may receive configuration information, where the configuration information is used to configure that the terminal device can send the CSI by using the first time interval, for example, configure that the terminal device can send the CSI by using a table including the first time interval. Optionally, before the terminal device receives the configuration information sent by the network device, the terminal device may send the first capability indication information to the network device, to report, to the network device, the capability of supporting the first time interval.

In this embodiment of this application, the terminal device may receive the configuration information, to indicate that the terminal device can report the CSI by using the first time interval, thereby improving communication efficiency.

Optionally, the terminal device further sends HARQ feedback information on the second uplink channel, where the HARQ feedback information is the HARQ feedback information corresponding to the PDSCH indicated by the DCI. That the terminal device sends the CSI on the first uplink channel includes: Before the terminal device sends the HARQ feedback information on the second uplink channel, the terminal device sends the CSI on the first uplink channel. The first uplink channel and the second uplink channel each may be indicated by the DCI, or may be separately indicated by the DCI and another piece of DCI. This is not limited in this embodiment of this application.

In this embodiment of this application, before the HARQ feedback information is sent on the second uplink channel, the CSI is sent on the first uplink channel. The two pieces of information are sent on the two channels, so that the two pieces of information do not affect each other, thereby ensuring reliability of respective channels and improving communication efficiency.

In some examples, that the terminal device sends the CSI on the first uplink channel includes: The terminal device sends the CSI and the HARQ feedback information on the first uplink channel, where the terminal device separately encodes the CSI and the HARQ feedback information. Optionally, when performing encoding mapping on the CSI and the HARQ feedback information, the terminal device maps the CSI before the HARQ feedback information.

In some examples, that the terminal device sends the CSI on the first uplink channel includes: The terminal device sends the CSI and the HARQ feedback information on the first uplink channel, where the terminal device jointly encodes the CSI and the HARQ feedback information. Optionally, when performing bit concatenation on the CSI and the HARQ feedback information, the terminal device may place a CSI bit before a HARQ feedback information bit.

In this embodiment of this application, the CSI and the HARQ feedback information are sent on the first uplink channel. Because the CSI may be generated earlier than the HARQ feedback information, the CSI may be first mapped or the CSI bit may be first placed, and then the HARQ feedback information is mapped or the HARQ feedback information bit is placed, so as to reduce an encoding time, and improve communication efficiency.

Optionally, the method in this embodiment of this application further includes: receiving a downlink reference signal, where the downlink reference signal is a measurement resource used to obtain the CSI; and determining, based on the DCI and/or the higher layer signaling, a second time interval from a plurality of candidate second time intervals corresponding to the first subcarrier spacing, where the second time interval is used to determine whether the first indication information is valid or whether the CSI is updated, and a correspondence between the first subcarrier spacing and the second time interval meets at least one of the following conditions: a second time interval corresponding to a 15 kHz subcarrier spacing is less than or equal to six symbols, a second time interval corresponding to a 30 kHz subcarrier spacing is less than or equal to 10 symbols, a second time interval corresponding to a 60 kHz subcarrier spacing is less than or equal to 20 symbols, and a second time interval corresponding to a 120 kHz subcarrier spacing is less than or equal to 35 symbols.

Optionally, the second time interval may be a shortest time interval between the last symbol on which the downlink reference signal is located and the first symbol of the uplink channel used to carry the CSI corresponding to the downlink reference signal, and the downlink reference signal is a measurement resource used to obtain the CSI. Alternatively, the second time interval is a time between a moment for "a measurement resource" and a moment for "obtaining the uplink channel used to carry the CSI" by the terminal device. In other words, in an actual system, a time interval needs to be greater than or equal to the second time interval. If the time interval is less than the second time interval, the terminal device may not report the CSI, or may ignore trigger information sent by the network device. The second time interval may be represented by using $Z_{(1)}'$.

The terminal device may determine, based on both the first time interval and the second time interval, whether the first indication information is valid.

For example, when a time interval between the last symbol on which the downlink reference signal is located and the first symbol of the first uplink channel is greater than or equal to the second time interval, and the time interval between the last symbol of the PDCCH and the first symbol of the first uplink channel is greater than or equal to the first time interval, the terminal device may determine that the first indication information is valid. Alternatively, when a time interval between the last symbol on which the downlink reference signal is located and the first symbol of the first uplink channel is less than the second time interval, the terminal device determines that the first indication information is invalid. Alternatively, when the time interval between the last symbol of the PDCCH and the first symbol of the first uplink channel is less than the first time interval, the terminal device determines that the first indication information is invalid.

If the time interval between the last symbol of the PDCCH and the first symbol of the first uplink channel is greater than or equal to the first time interval, but the time interval between the last symbol on which the downlink reference signal is located and the first symbol of the first uplink channel is less than the second time interval, the terminal device determines that the first indication information is invalid.

Optionally, the terminal device may determine, based on the second time interval, whether to update the CSI triggered by the first indication information. For example, when a time interval between the last symbol on which the downlink reference signal is located and the first symbol of the first uplink channel is greater than or equal to the second time interval, the terminal device determines to update the CSI. Alternatively, when a time interval between the last symbol on which the downlink reference signal is located and the first symbol of the first uplink channel is less than the second time interval, the terminal device determines not to update the CSI, or determines not to generate updated CSI based on the downlink reference signal or send the CSI. That the CSI is not updated may be understood as that the updated CSI is not generated based on the downlink reference signal.

If the time interval between the last symbol on which the downlink reference signal is located and the first symbol of the first uplink channel is greater than or equal to the second time interval, it indicates that the terminal device has sufficient time to obtain the CSI report in the CSI based on the downlink reference signal, and therefore the terminal device may determine to update the CSI. If the time interval between the last symbol on which the downlink reference signal is located and the first symbol of the first uplink channel is less than the second time interval, it indicates that the terminal device does not have sufficient time to generate updated CSI, and therefore the terminal device may determine not to update the CSI.

Optionally, that the terminal device determines, based on the first time interval, whether to send the CSI on the first uplink channel includes: The terminal device determines, based on the first time interval and the second time interval, whether to send the CSI on the first uplink channel.

For example, if the terminal device determines, based on the first time interval, that the first indication information is valid, and the terminal device also determines, based on the second time interval, that the first indication information is valid, the terminal device sends, on the first uplink channel, the CSI triggered by the first indication information.

For another example, if the terminal device determines, based on the first time interval, that the first indication information is invalid or determines, based on the second time interval, that the first indication information is invalid, the terminal device may not send the first uplink channel, or the terminal device may send the first uplink channel, but does not send, on the first uplink channel, the CSI triggered by the first indication information, or the terminal device may abandon sending the CSI or discard the DCI.

For another example, if the terminal device determines, based on the first time interval, that the first indication information is valid, and the terminal device determines, based on the second time interval, not to update the CSI, the terminal device may not send the first uplink channel, or the terminal device may send the first uplink channel, but does not send, on the first uplink channel, the CSI triggered by the first indication information, or the terminal device may send, on the first uplink channel, unupdated CSI triggered by the first indication information.

For another example, if the terminal device determines, based on the first time interval, that the first indication information is valid, and the terminal device determines, based on the second time interval, to update the CSI, the terminal device may send updated CSI on the first uplink channel.

Optionally, the second time interval has a plurality of values. For example, the value of the second time interval may meet at least one of the values shown in Table 10. In this embodiment of this application. Y1, Y2, Y3, and Y4 represent second time intervals corresponding to subcarrier spacings of 15 kHz, 30 kHz, 60 kHz, and 120 kHz. Details are not described below.

Y1 is a positive number greater than 0, $Y1 \leq 6$, $Y2 \leq 10$, $Y3 \leq 20$, and $Y4 \leq 35$.

TABLE 10

| Subcarrier spacing (unit: kHz) | Second time interval (unit: symbol). |
|---|---|
| 15 | Y1 |
| 30 | Y2 |
| 60 | Y3 |
| 120 | Y4 |

It should be noted that, in this embodiment of this application, the subcarrier spacing corresponding to the second time interval may include one or more of 15 kHz, 30 kHz, 60 kHz, and 120 kHz, or may include another subcarrier spacing, for example, 240 kHz. The second time intervals in Table 10 and Table 11 may be considered as relatively shorts second time intervals, and the second time intervals in Table 12 or Table 13 may be considered as relatively long second time intervals. The relatively short second time interval may support only some subcarrier spacings. For example, the relatively short second time interval may support only subcarrier spacings of 15 kHz, 30 kHz, and 60 kHz, or the relatively short second time interval may support only subcarrier spacings of 30 kHz and 60 kHz. It may be understood that, in this case, another subcarrier spacing does not support a relatively short second time interval, and therefore a relatively long second time interval may be used for the another subcarrier spacing.

Optionally, some entries in Table 10 may be recombined to form a new table. The second time interval may be determined from the new table. The new table may include, for example, a part of Table 10, for example, one row, two rows, or three rows of content in Table 10. Alternatively, the new table may indicate a correspondence between some subcarrier spacings and second time intervals. For example, the some subcarrier spacings may be one or more of 15 kHz, 30 kHz, 60 kHz, and 120 kHz.

Optionally, Y1, Y2, Y3, and Y4 are positive numbers greater than 0, Y1≤6, Y2≤10, Y3≤20, and Y4≤35.

Optionally, Y1≤Y2≤Y3≤Y4.

For example, Y1 may be one of the following: 1, 1.5, 2, 2.5, 3, 3.5, 4, 4.5, 5, 5.5, and 6.

For example, Y2 may be one of the following: 1, 1.5, 2, 2.5, 3, 3.5, 4, 4.5, 5, 5.5, 6, 6.5, 7, 7.5, 8, 8.5, 9, 9.5, and 10.

For example, Y3 may be one of the following: 3.5, 4, 4.5, 5, 5.5, 6, 6.5, 7, 7.5, 8, 8.5, 9, 9.5, 10, 10.5, 11, 11.5, 12, 12.5, 13, 13.5, 14, 14.5, 15, 15.5, 16, 16.5, 17, 17.5, 18, 18.5, 19, 19.5, and 20.

For example, Y4 may be one of the following: 6.5, 7, 7.5, 8, 8.5, 9, 9.5, 10, 10.5, 11, 11.5, 12, 12.5, 13, 13.5, 14, 14.5, 15, 15.5, 16, 16.5, 17, 17.5, 18, 18.5, 19, 19.5, 20, 20.5, 21, 21.5, 22, 22.5, 23, 23.5, 24, 24.5, 25, 25.5, 26, 26.5, 27, 27.5, 28, 28.5, 29, 29.5, 30, 30.5, 31, 31.5, 32, 32.5, 33, 33.5, 34, 34.5, and 35.

Optionally, Y1, Y3, and Y4 are positive integers, and Y2 is a positive integer or a positive non-integer.

Optionally, the second time interval has a plurality of values. For example, Y1, Y2, Y3, and Y4 in Table 10 may meet at least one of the following conditions Y1≤Y2≤2×Y1: Y2≤Y3≤2×Y2; and Y3≤Y4≤2×Y3. The foregoing formulas are used to indicate that a value range of Y2 may be a closed interval between Y1 and 2×Y1, a value range of Y3 may be a closed interval between Y2 and 2×Y2, and a value range of Y4 may be a closed interval between Y3 and 2×Y3.

In some other embodiments, Y1, Y2, Y3, and Y4 in Table 10 may meet at least one of the following conditions: Y1≤A×10 or A×9; Y1≤B×13: Y1≤C×25; and Y1≤D×43, where A, B, C, and D are positive numbers greater than 0 and less than or equal to 1.

In this embodiment of this application, the value of the second time interval is limited, so that the terminal device can measure the CSI in time based on the second time interval, and report a latest channel state. This helps the network device more accurately allocate a downlink resource, thereby increasing system resource utilization and improving communication efficiency.

In an example, the value of the second time interval may meet at least one of the following: Y1≤6, Y2≤10, Y3≤20, and Y4≤35.

In some other examples, the value of the second time interval may meet at least one of the following: Y1≤4, Y2≤6, Y3≤11, and Y4≤18.

In some other examples, the value of the second time interval may meet at least one of the following Y1≤6, Y2≤10, and Y3≤20.

Optionally, before sending the CSI, the terminal device may alternatively determine the first time interval and the second time interval based on Table 11. In an example, Table 11 shows a correspondence between a subcarrier spacing, the first time interval, and the second time interval. For values of X1, X2, X3, and X4 in Table 11, refer to the foregoing descriptions of the first time interval. For example, at least some limitations in either of Table 1 and Table 2 may be met. For values of Y1, Y2, Y3, and Y4, refer to the foregoing descriptions of the second time interval. For example, at least some limitations in Table 10 may be met.

TABLE 11

| Subcarrier spacing (unit: kHz) | First time interval (unit: symbol) | Second time interval (unit: symbol) |
| --- | --- | --- |
| 15 | X1 | Y1 |
| 30 | X2 | Y2 |
| 60 | X3 | Y3 |
| 120 | X4 | Y4 |

It should be noted that, in this embodiment of this application, the subcarrier spacings/the subcarrier spacing corresponding to the first time interval and/or the second time interval may include one or more of 15 kHz, 30 kHz, 60 kHz, and 120 kHz, or may include another subcarrier spacing, for example, 240 kHz. A relatively short first time interval and/or second time interval may support only some subcarrier spacings. For example, the relatively short first time interval and/or second time interval may support only subcarrier spacings of 15 kHz, 30 kHz, and 60 kHz, or the relatively short first time interval and/or second time interval may support only subcarrier spacings of 30 kHz and 60 kHz. It may be understood that, in this case, another subcarrier spacing does not support a relatively short first time interval and/or second time interval, and therefore a relatively long first time interval and/or second time interval may be used for the another subcarrier spacing.

Optionally, some entries in Table 1, Table 2, Table 10, and/or Table 11 may be recombined to form a new table. The first time interval and/or the second time interval may be determined from the new table. The new table may include, for example, a part of Table 1, Table 2, Table 10, and/or Table 11, for example, one row, two rows, or three rows of content in Table 10, or one row, two rows, or three rows of content in Table 11. Alternatively, some entries in Table 1, Table 2, Table 10, and/or Table 11 are recombined. Alternatively, the new table may indicate a correspondence between each of some subcarrier spacings and the first time interval and/or the second time interval. For example, the some subcarrier spacings may be one or more of 15 kHz, 30 kHz, 60 kHz, and 120 kHz.

The plurality of candidate second time intervals may include the second time intervals shown in Table 10 and Table 11. Optionally, the plurality of candidate second time intervals may alternatively include the second time interval shown in Table 12 or Table 13. The second time interval shown in Table 12 or Table 13 is greater than the second time intervals shown in Table 10 and Table 11. Optionally, in some embodiments, the terminal device may alternatively select the second time interval from Table 12 or Table 13 to report the CSI.

TABLE 12

| Subcarrier spacing (unit: kHz) | Second time interval (unit: symbol) |
| --- | --- |
| 15 | 8 or 7 |
| 30 | 11 |
| 60 | 21 |
| 120 | 36 |

TABLE 13

| Subcarrier spacing (unit: kHz) | Second time interval (unit: symbol) |
| --- | --- |
| 15 | 16 |
| 30 | 30 |

TABLE 13-continued

| Subcarrier spacing (unit: kHz) | Second time interval (unit: symbol) |
|---|---|
| 60 | 42 |
| 120 | 85 |

In this embodiment of this application, the terminal device may preconfigure or predefine the plurality of candidate second time intervals. The terminal device may select an appropriate second time interval from the plurality of candidate second time intervals based on the DCI and/or the higher layer signaling, and report the CSI based on the second time interval, so as to improve CSI reporting flexibility.

Figure 4:
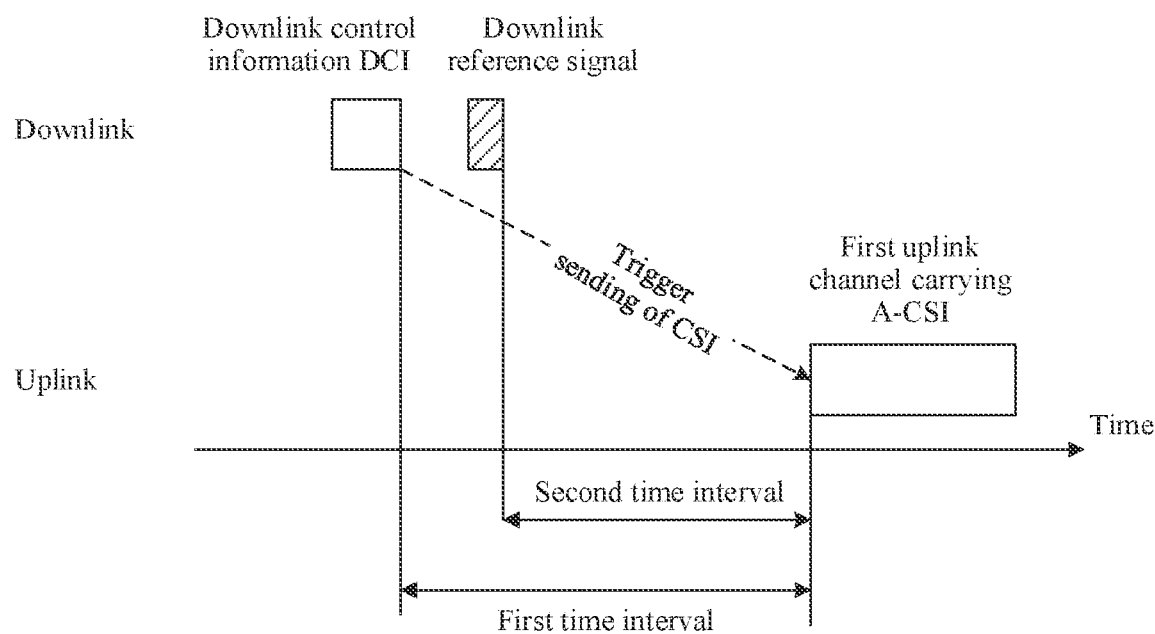
FIG. 4 is a schematic diagram of a scenario of CSI reporting according to another embodiment of this application.

In an example, FIG. 4 is a schematic diagram of a scenario of CSI sending according to another embodiment of this application. As shown in FIG. 4, the downlink reference signal may be sent before or after the DCI. The terminal device can obtain the CSI report only after measuring the downlink reference signal. The terminal device may measure the downlink reference signal after receiving the DCI, and generate the CSI report based on a measurement result.

Optionally, the first subcarrier spacing may be used to determine a corresponding second time interval. For example, the corresponding second time interval may be determined from Table 10 to Table 13 based on the first subcarrier spacing.

It should be noted that a smaller subcarrier spacing indicates longer absolute duration corresponding to a second time interval corresponding to the subcarrier spacing, and therefore a lower requirement on a processing capability of the terminal device.

In some examples, the second time interval meets the following condition, the second time interval is less than or equal to a time interval between the last symbol of a PDSCH indicated by the DCI and the first symbol of a second uplink channel.

In this embodiment of this application, the second time interval is less than or equal to the time interval between the last symbol of the PDSCH indicated by the DCI and the first symbol of the second uplink channel, so that the network device allocates a downlink resource based on the CSI that is reported in time, thereby improving resource utilization.

Further, the second time interval meets the following condition: the second time interval corresponding to the first subcarrier spacing is less than or equal to a third time interval corresponding to the first subcarrier spacing, where the third time interval is less than or equal to the time interval between the last symbol of the PDSCH indicated by the DCI and the first symbol of the second uplink channel, and the third time interval may include the process time 1 or $N_1$ described above. Details are not described herein again.

In this embodiment of this application, the second time interval corresponding to the first subcarrier spacing is less than or equal to the third time interval corresponding to the first subcarrier spacing, so that the network device can receive the CSI before the HARQ feedback information. This helps the network device allocate a downlink resource based on the CSI that is reported in time, thereby increasing resource utilization.

In this embodiment of this application, the terminal device may determine the second time interval in a plurality of manners. For example, the terminal device determines the second time interval when at least one of the following conditions is met: a time interval between a slot in which the PDSCH indicated by the DCI is located and a slot in which the HARQ feedback information is located is less than or equal to a fourth threshold; a time length of a time domain resource of the PDSCH indicated by the DCI is less than or equal to a fifth threshold; and a time length of a time domain resource of the first uplink channel is less than or equal to a sixth threshold.

Optionally, that the terminal device determines the second time interval may include: The terminal device determines to use a relatively short second time interval. For example, the terminal device determines to use the second time intervals limited in Table 10 and Table 11.

The fourth threshold to the sixth threshold are not limited in this embodiment of this application. The fourth threshold to the sixth threshold may be predefined, or may be configured by the network device for the terminal device by using the higher layer signaling, or may be obtained in another manner. The fourth threshold to the sixth threshold may be integers greater than or equal to 0. The terminal device may obtain, by using the DCI, the information used to determine the second time interval, or may obtain, in another manner, for example, by using the higher layer signaling, the information used to determine the second time interval. This is not limited in this embodiment of this application.

In this embodiment of this application, the terminal device may determine the second time interval based on at least one of the information included in the DCI or the higher layer signaling, or the terminal device determines, based on at least one of the plurality of pieces of information, to report the CSI based on the second time interval, thereby improving communication efficiency.

The following continues to describe, with reference to examples, various manners of determining the second time interval by the terminal device. In this embodiment of this application, the information for determining the second time interval may be indicated by the DCI, the higher layer signaling, or another type of signaling. In the following examples, that the information for determining the second time interval is indicated by the DCI is used as an example for description.

The following continues to describe various manners of determining the second time interval by the terminal device. Content that is the same as or similar to the foregoing content is not described herein again.

In a first manner, if the time interval between the slot in which the PDSCH indicated by the DCI is located and the slot in which the HARQ feedback information is located is less than or equal to the fourth threshold, it may be considered that the currently transmitted service is relatively time-sensitive. Therefore, the CSI needs to be fed back by using a shorter second time interval, so as to improve system resource efficiency. It may be understood that the terminal device determines the second time interval based on the time interval between the slot in which the PDSCH indicated by the DCI is located and the slot in which the HARQ feedback information is located.

For example, if the time interval between the slot in which the PDSCH is located and the slot in which the HARQ feedback information is located is less than or equal to the fourth threshold, the terminal device may determine the second time intervals shown in Table 10 and Table 11. If the time interval between the slot in which the PDSCH is located and the slot in which the HARQ feedback information is located is greater than the fourth threshold, the terminal device may determine another second time interval, and the another second time interval is greater than the second time intervals in Table 10 and Table 11, for example, the second time interval in Table 12 or Table 13.

In a second manner, if the time length of the time domain resource of the PDSCH indicated by the DCI is less than or equal to the fifth threshold, it may be considered that the currently transmitted service is relatively time-sensitive. Therefore, the CSI needs to be fed back by using a shorter second time interval. For example, if the time length of the time domain resource of the PDSCH is less than or equal to the fifth threshold, the terminal device may determine the second time intervals in Table 10 and Table 11. If the time length of the time domain resource of the PDSCH is greater than the fifth threshold, the terminal device may determine another second time interval, and the another second time interval is greater than the second time intervals in Table 10 and Table 11, for example, the second time interval in Table 12 or Table 13.

In a third manner, if the time length of the time domain resource of the first uplink channel is less than or equal to the sixth threshold, it may be considered that the currently transmitted service is relatively time-sensitive. Therefore, the CSI needs to be fed back by using a shorter second time interval. For example, if the time length of the time domain resource of the first uplink channel is less than or equal to the sixth threshold, the terminal device determines the second time intervals in Table 10 and Table 11. If the time length of the time domain resource of the first uplink channel is greater than the sixth threshold, the terminal device may determine another second time interval, and the another second time interval is greater than the second time intervals in Table 10 and Table 11, for example, the second time interval in Table 12 or Table 13.

In a fourth manner, the terminal device may alternatively determine the second time interval based on the information about the CSI report. In some other examples, the terminal device may determine the second time interval based on the information about the CSI report and the information about the downlink reference signal.

The CSI triggered by the first indication information includes the one or more CS reports. The information about the CSI report may include information indicating the second time interval. The information indicating the second time interval may be, for example, a table indicating the second time intervals. The terminal device may determine that a second time interval indicated in the table is the second time interval corresponding to reporting of the CSI.

For example, the information about the CSI report may be used to indicate the second time interval corresponding to the one or more CSI reports, or indicate a correspondence between the second time interval corresponding to the one or more CSI reports and the subcarrier spacing. For example, the information about the CSI report may include either of Table 10 and Table 11, or may include at least some entries in Table 10 and Table 11, or may include another table indicating the correspondence between the second time interval and the subcarrier spacing. The terminal device may determine the second time interval based on the information about the CSI report.

Optionally, the terminal device may alternatively determine the second time interval based on the information about the downlink reference signal. For example, the information about the downlink reference signal may indicate type information or other feature information of the downlink reference signal. For example, if the type information of the downlink reference signal that is indicated by the information about the downlink reference signal includes the DMRS, the terminal device may determine to report the CSI by using the second time intervals in Table 10 and Table 11. If the type information of the downlink reference signal that is indicated by the information about the downlink reference signal includes the CSI-RS, the terminal device may determine to report the CSI by using another second time interval.

In a fifth manner, the terminal device may determine the second time interval when an RNTI used to scramble the DCI is a first RNTI, where modulation and coding scheme MCS information in the DCI scrambled by using the first RNTI corresponds to a first MCS table, and the first MCS table includes MCS information whose spectral efficiency is 0.0586. For the first MCS table, refer to Table 8, Table 9, and related descriptions described above. The DCI scrambled by using the first RNTI may implicitly notify the terminal device that the CSI triggered by the DCI is important or urgent, and therefore the CSI needs to be sent based on a shorter second time interval, for example, the second time intervals in Table 10 and Table 11.

Optionally, the second time interval may be indicated to the terminal device by using another RNTI.

In this embodiment of this application, the terminal device may determine the second time interval based on a type of an RNTI used to scramble the DCI. In other words, the type of the RNTI used to scramble the DCI may implicitly indicate the second time interval, thereby improving communication efficiency.

In a sixth manner, when learning of service reliability, the terminal device may alternatively determine the second time interval based on the service reliability. For example, if a service corresponding to the terminal device needs a BLER less than 0.00001, it may be considered that the DCI implicitly notifies the terminal device that the CSI triggered by the DCI is important or urgent, and therefore the CSI needs to be sent based on a shorter second time interval.

In a seventh manner, the terminal device may determine the second time interval if search space in which the DCI is located is user-dedicated search space. In other words, the search space in which the DCI is located may implicitly indicate the second time interval. For example, if the search space in which the DCI is located is user-dedicated search space, the terminal device determines to report the CSI by using the second time intervals in Table 10 and Table 11. If the search space in which the DCI is located is common search space, the terminal device does not report the CSI, or reports the CSI by using a second time interval in another table. The second time interval in the another table is greater than the second time intervals in Table 10 and Table 11.

It may be understood that the first manner to the seventh manner each may be used to determine the second time interval, or two or more manners thereof may be used to jointly determine the second time interval.

Optionally, the terminal device may send second capability indication information to the network device, where the second capability indication information is used to indicate whether the terminal device supports a capability of the second time interval. For example, the terminal device may report, to the network device, that the terminal device supports the second time intervals in Table 10 and Table 11, or report, to the network device, that the terminal device does not support the second time intervals in Table 10 and Table 11.

In this embodiment of this application, the terminal device reports, to the network device, a capability of supporting or not supporting the second time interval, so that the network device allocates a resource to the terminal device based on the reported capability of supporting the second time interval, thereby improving communication efficiency.

Optionally, the terminal device may receive configuration information, where the configuration information is used to configure that the terminal device can send the CSI by using the second time interval, for example, configure that the terminal device can send the CSI based on the second time intervals in Table 10 and Table 11. Optionally, before the terminal device receives the configuration information sent by the network device, the terminal device may send the second capability indication information to the network device, to report, to the network device, the capability of supporting the second time interval.

In this embodiment of this application, the terminal device may receive the configuration information, to indicate that the terminal device can report the CSI by using the second time interval, thereby improving communication efficiency.

Figure 5:
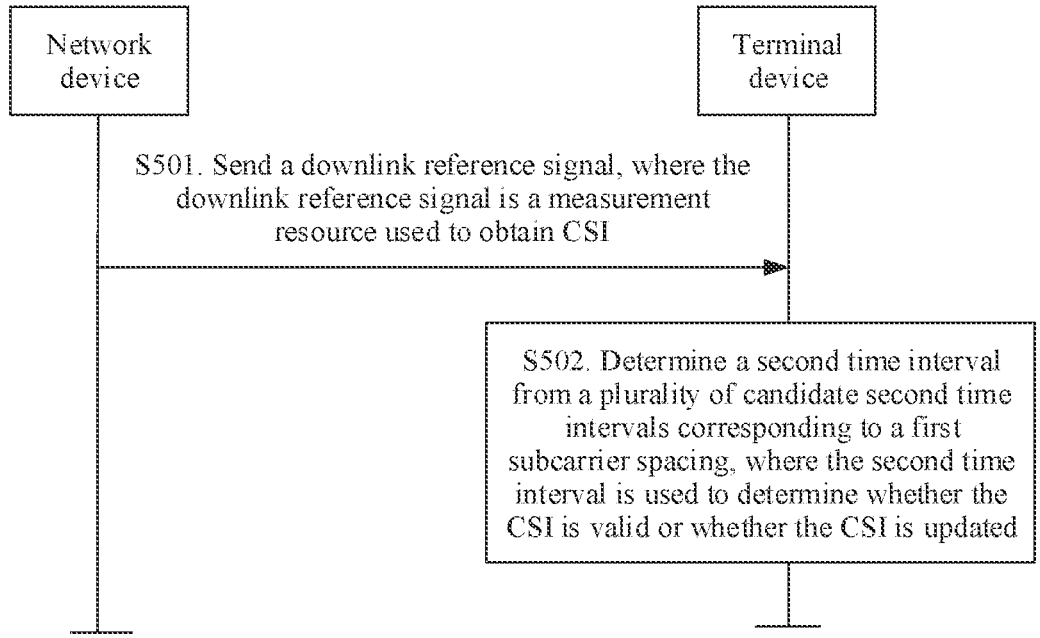
FIG. 5 is a schematic flowchart of a CSI reporting method according to another embodiment of this application.

FIG. 5 is a schematic flowchart of a CSI reporting method according to another embodiment of this application. For brevity, content in the method in FIG. 5 that is the same as or similar to the foregoing content is not described herein again. The method in FIG. 5 includes the following steps.

S501. A network device sends a downlink reference signal to a terminal device, and correspondingly, the terminal device receives the downlink reference signal, where the downlink reference signal is a measurement resource used to obtain CSI.

The downlink reference signal may be, for example, a CSI-RS, a synchronization sequence/physical broadcast channel block (SSB), or another reference channel. The network device may allocate a downlink transmission resource to the terminal device by obtaining the CSI reported by the terminal device. When the terminal device reports CSI in time, the network device can more accurately allocate a resource, thereby increasing system resource utilization.

S502. The terminal device determines a second time interval from a plurality of candidate second time intervals corresponding to a first subcarrier spacing, where the second time interval is used to determine whether the CSI is valid or whether the CSI is updated, and a correspondence between the second time interval and the first subcarrier spacing meets at least one of the following conditions: a second time interval corresponding to a 15 kHz subcarrier spacing is less than or equal to six symbols, a second time interval corresponding to a 30 kHz subcarrier spacing is less than or equal to 10 symbols, a second time interval corresponding to a 60 kHz subcarrier spacing is less than or equal to 20 symbols, and a second time interval corresponding to a 120 kHz subcarrier spacing is less than or equal to 35 symbols.

The CSI includes the at least one CSI report. The terminal device may obtain the at least one CSI report by measuring the downlink reference signal.

Optionally, the CSI may be periodic CSI such as P-CSI, or may be aperiodic CSI such as A-CSI or SP-CSI.

For descriptions of the second time interval, refer to the foregoing related descriptions. For brevity, details are not described herein again. For example, the second time interval may be the second time intervals shown in Table 10 and Table 11. The plurality of candidate second time intervals may be the second time intervals shown in Table 10 to Table 13.

The terminal device may determine, in a plurality of manners, the second time interval from the plurality of candidate second time intervals corresponding to the first subcarrier spacing. For example, the terminal device may determine the second time interval from the plurality of candidate second time intervals based on DCI and/or higher layer signaling. For details, refer to the foregoing descriptions. Alternatively, if the CSI is periodic CSI, the terminal device may determine a location of a channel for periodically sending the CSI, and the terminal device may determine the second time interval based on whether a time interval between the last symbol on which the downlink reference signal is located and the first symbol of the channel for periodically sending the CSI is greater than a seventh threshold. For example, if the time interval is less than or equal to the seventh threshold, a relatively short second time interval may be selected, for example, the second time interval in Table 10 or Table 11. If the time interval is greater than the seventh threshold, a relatively long second time interval may be selected, for example, the second time interval in Table 12 or Table 13. The seventh threshold may be predefined, or may be determined in another manner. This is not limited in this embodiment of this application.

Optionally, the terminal device may determine, based on the second time interval, whether the CSI is valid. For example, when a time interval between the last symbol on which the downlink reference signal is located and the first symbol of the first uplink channel is greater than or equal to the second time interval, the terminal device determines that the CSI is valid, that is, determines to generate updated CSI based on the downlink reference signal and send the CSI on the first uplink channel. Alternatively, when a time interval between the last symbol on which the downlink reference signal is located and the first symbol of the first uplink channel is less than the second time interval, the terminal device determines that the CSI is invalid, or determines not to generate updated CSI based on the downlink reference signal or send the CSI or send the first uplink channel.

Optionally, the terminal device may determine, based on the second time interval, whether to update the CSI. For example, when a time interval between the last symbol on which the downlink reference signal is located and the first symbol of the first uplink channel is greater than or equal to the second time interval, the terminal device determines to update the CSI. Alternatively, when a time interval between the last symbol on which the downlink reference signal is located and the first symbol of the first uplink channel is less than the second time interval, the terminal device determines not to update the CSI, or determines not to generate updated CSI based on the downlink reference signal or send the CSI or send the first uplink channel. That the CSI is not updated may be understood as that the updated CSI is not generated based on the downlink reference signal.

If the time interval between the last symbol on which the downlink reference signal is located and the first symbol of the first uplink channel is greater than or equal to the second time interval, it indicates that the terminal device has sufficient time to obtain the CSI report in the CSI based on the downlink reference signal, and therefore the terminal device may determine to update the CSI and send the CSI. If the time interval between the last symbol on which the downlink reference signal is located and the first symbol of the first uplink channel is less than the second time interval, it indicates that the terminal device does not have sufficient time to generate updated CSI, and therefore the terminal device may determine not to update the CSI or send the CSI.

Optionally, the method further includes: The terminal device sends the CSI on the first uplink channel, and correspondingly, the network device receives the CSI from the terminal device on the first uplink channel, where the CSI is sent based on the second time interval corresponding to the first subcarrier spacing. For example, if the terminal device determines, based on the second time interval, that the CSI is valid, the terminal device sends the CSI to the network device. Alternatively, if the terminal device determines, based on the second time interval, to update the CSI, the terminal device sends updated CSI to the network device. Alternatively, if the terminal device determines, based on the second time interval, not to update the CSI, the terminal device sends unupdated CSI to the network device.

In this embodiment of this application, the terminal device may determine, based on the second time interval, whether to report the CSI or whether to update the CSI, thereby increasing system resource utilization.

In this embodiment of this application, the plurality of candidate second time intervals may be preconfigured or predefined for the first subcarrier spacing. The terminal device may select an appropriate second time interval from the plurality of candidate second time intervals, and report the CSI based on the second time interval, so as to improve CSI reporting flexibility.

In this embodiment of this application, the value of the second time interval is limited, so that the terminal device can report the CSI in time based on the second time interval. This helps the network device more accurately allocate a downlink resource, thereby increasing system resource utilization and improving communication efficiency.

Figure 6:
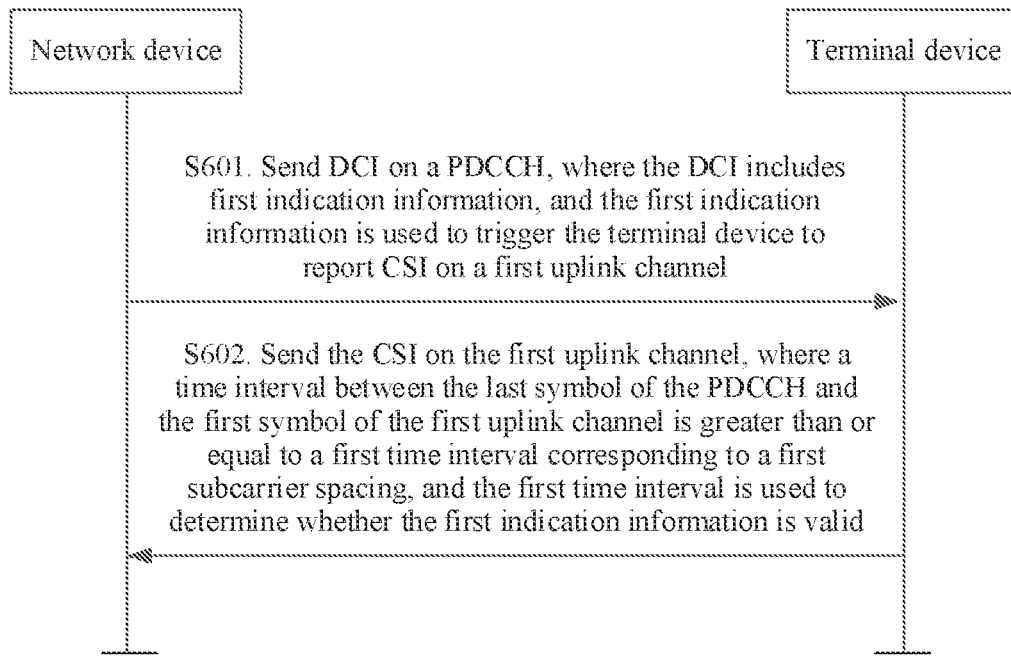
FIG. 6 is a schematic flowchart of a CSI reporting method according to another embodiment of this application.

FIG. 6 is a schematic flowchart of a CSI reporting method according to another embodiment of this application. A part that is the same as or similar to the foregoing part in the method in FIG. 6 is not described herein again. For example, for a definition of a first time interval, refer to the foregoing related descriptions. The method in FIG. 6 includes the following steps.

S601. A network device sends DCI on a PDCCH, and correspondingly, a terminal device receives the DCI on the PDCCH, where the DCI includes first indication information, and the first indication information is used to trigger the terminal device to report CSI on a first uplink channel.

S602. The terminal device sends the CSI on the first uplink channel, and correspondingly, the network device receives the CSI from the terminal device on the first uplink channel, where a time interval between the last symbol of the PDCCH and the first symbol of the first uplink channel is greater than or equal to a first time interval corresponding to a first subcarrier spacing, the first time interval is used to determine whether the first indication information is valid, and the first subcarrier spacing is a smallest value in a subcarrier spacing corresponding to a DMRS corresponding to a PDSCH indicated by the DCI, a subcarrier spacing corresponding to the PDCCH, and a subcarrier spacing corresponding to the first uplink channel; or the first subcarrier spacing is a smallest value in a subcarrier spacing corresponding to a CSI-RS, a subcarrier spacing corresponding to a DMRS corresponding to a PDSCH indicated by the DCI, a subcarrier spacing corresponding to the PDCCH, and a subcarrier spacing corresponding to the first uplink channel.

Optionally, for the first time interval, refer to the foregoing corresponding descriptions. The first time interval may be the first time intervals shown in Table 1 and Table 2, or may be the first time interval shown in Table 3.

In this embodiment of this application, the terminal device may use the DMRS as the downlink reference signal. The DMRS may be used for downlink data channel estimation, and may be further used to obtain the CSI. Therefore, resource utilization is increased, and communication efficiency is further improved.

Optionally, the first subcarrier spacing is one of the following: a 15 kHz subcarrier spacing, a 30 kHz subcarrier spacing, a 60 kHz subcarrier spacing, and a 120 kHz subcarrier spacing.

The foregoing describes the CSI reporting method in the embodiments of this application with reference to FIG. 1 to FIG. 6. The following describes an apparatus in the embodiments of this application with reference to FIG. 7 to FIG. 11.

Figure 7:
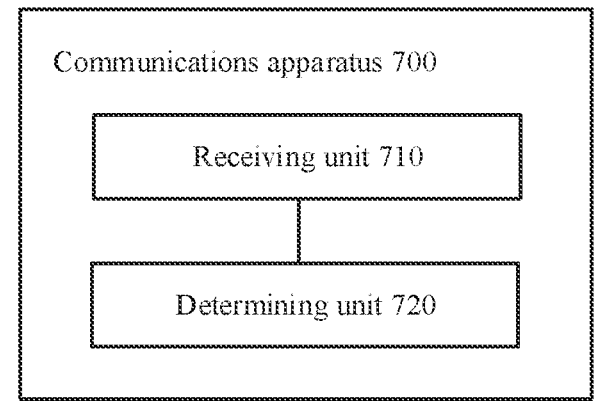
FIG. 7 is a schematic structural diagram of a communications apparatus according to an embodiment of this application.

FIG. 7 is a schematic block diagram of a communications apparatus 700 according to an embodiment of this application. The communications apparatus 700 can perform the steps performed by the terminal device in the method in FIG. 2. To avoid repetition, details are not described herein again. The communications apparatus 700 may be a terminal device, or may be a chip in the terminal device. The communications apparatus 70 includes a receiving unit 710 and a determining unit 720.

The receiving unit 710 is configured to receive DCI on a PDCCH, where the DCI includes first indication information, and the first indication information is used to trigger the terminal device to report CSI on a first uplink channel. The determining unit 720 is configured to determine, based on the DCI and/or higher layer signaling, a first time interval from a plurality of candidate first time intervals corresponding to a first subcarrier spacing, where the first time interval is used to determine whether the first indication information is valid, the first subcarrier spacing is one of the following plurality of subcarrier spacings: a 15 kHz subcarrier spacing, a 30 kHz subcarrier spacing, a 60 kHz subcarrier spacing, and a 120 kHz subcarrier spacing, and a correspondence between the first subcarrier spacing and the first time interval meets at least one of the following conditions: a first time interval corresponding to a 15 kHz subcarrier spacing is less than or equal to eight symbols, a first time interval corresponding to a 30 kHz subcarrier spacing is less than or equal to 12 symbols, a first time interval corresponding to a 60 kHz subcarrier spacing is less than or equal to 24 symbols, and a first time interval corresponding to a 120 kHz subcarrier spacing is less than or equal to 42 symbols.

Alternatively, the receiving unit 710 is configured to receive a downlink reference signal, where the downlink reference signal is a measurement resource used to obtain CSI. The determining unit 720 is configured to determine a second time interval from a plurality of candidate second time intervals corresponding to a first subcarrier spacing, where the second time interval is used to determine whether the CSI is valid or whether the CSI is updated, and a correspondence between the second time interval and the first subcarrier spacing meets at least one of the following conditions: a second time interval corresponding to a 15 kHz subcarrier spacing is less than or equal to six symbols, a second time interval corresponding to a 30 kHz subcarrier spacing is less than or equal to 10 symbols, a second time interval corresponding to a 60 kHz subcarrier spacing is less than or equal to 20 symbols, and a second time interval corresponding to a 120 kHz subcarrier spacing is less than or equal to 35 symbols.

Figure 8:
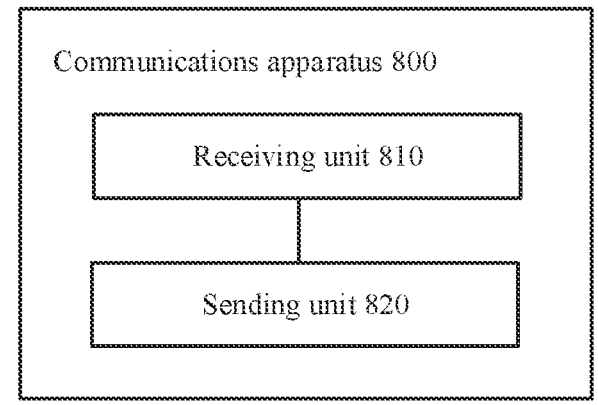
FIG. 8 is a schematic structural diagram of a communications apparatus according to another embodiment of this application.

FIG. 8 is a schematic block diagram of a communications apparatus 800 according to an embodiment of this application. The communications apparatus 800 can perform the steps performed by the terminal device in the method in FIG. 5 or FIG. 6. To avoid repetition, details are not described herein again. The communications apparatus 800 may be a terminal device, or may be a chip in the terminal device. The communications apparatus 800 includes a receiving unit 810 and a sending unit 820.

The receiving unit 810 is configured to receive DCI on a PDCCH, where the DCI includes first indication information, and the first indication information is used to trigger the terminal device to report CSI on a first uplink channel. The sending unit 820 is configured to send the CSI on the first uplink channel, where a time interval between the last symbol of the PDCCH and the first symbol of the first uplink channel is greater than or equal to a first time interval corresponding to a first subcarrier spacing, the first time interval is used to determine whether the first indication information is valid, and the first subcarrier spacing is a smallest value in a subcarrier spacing corresponding to a DMRS corresponding to a PDSCH indicated by the DCI, a subcarrier spacing corresponding to the PDCCH, and a subcarrier spacing corresponding to the first uplink channel; or the first subcarrier spacing is a smallest value in a subcarrier spacing corresponding to a CSI-RS, a subcarrier spacing corresponding to a DMRS corresponding to a PDSCH indicated by the DCI, a subcarrier spacing corresponding to the PDCCH, and a subcarrier spacing corresponding to the first uplink channel.

Figure 9:
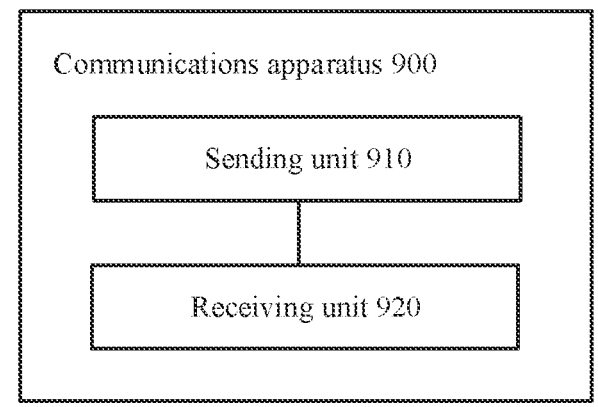
FIG. 9 is a schematic structural diagram of a communications apparatus according to another embodiment of this application.

FIG. 9 is a schematic block diagram of a communications apparatus 900 according to an embodiment of this application. The communications apparatus 900 can perform the steps performed by the network device in the method in FIG. 1 to FIG. 6. To avoid repetition, details are not described herein again. The communications apparatus 900 may be a network device, or may be a chip in the network device. The communications apparatus 900 includes a sending unit 910 and a receiving unit 920.

The sending unit 910 is configured to send DCI to a terminal device on a PDCCH, where the DCI includes first indication information, the first indication information is used to trigger the terminal device to report CSI on a first uplink channel, and the DCI and/or higher layer signaling are/is used to indicate to determine a first time interval from a plurality of candidate first time intervals corresponding to a first subcarrier spacing, where the first time interval is used to determine whether the first indication information is valid, the first subcarrier spacing is one of the following plurality of subcarrier spacings: a 15 kHz subcarrier spacing, a 30 kHz subcarrier spacing, a 60 kHz subcarrier spacing, and a 120 kHz subcarrier spacing, and a correspondence between the first subcarrier spacing and the first time interval meets at least one of the following conditions: a first time interval corresponding to a 15 kHz subcarrier spacing is less than or equal to eight symbols, a first time interval corresponding to a 30 kHz subcarrier spacing is less than or equal to 12 symbols, a first time interval corresponding to a 60 kHz subcarrier spacing is less than or equal to 24 symbols, and a first time interval corresponding to a 120 kHz subcarrier spacing is less than or equal to 42 symbols. The receiving unit 920 is configured to receive the CSI from the terminal device on the first uplink channel.

Alternatively, the sending unit 910 is configured to send a downlink reference signal to a terminal device, where the downlink reference signal is a measurement resource used to obtain CSI. The receiving unit 920 is configured to receive the CSI on a first uplink channel, where the CSI is sent based on a second time interval corresponding to a first subcarrier spacing, the second time interval is used to determine whether the CSI is valid or whether the CSI is updated, and a correspondence between the second time interval and the first subcarrier spacing meets at least one of the following conditions: a second time interval corresponding to a 15 kHz subcarrier spacing is less than or equal to six symbols, a second time interval corresponding to a 30 kHz subcarrier spacing is less than or equal to 10 symbols, a second time interval corresponding to a 60 kHz subcarrier spacing is less than or equal to 20 symbols, and a second time interval corresponding to a 120 kHz subcarrier spacing is less than or equal to 35 symbols.

Alternatively, the sending unit 910 is configured to send DCI on a PDCCH, where the DCI is used to trigger a terminal device to report CSI. The receiving unit 920 is configured to receive the CSI from the terminal device on a first uplink channel, where a time interval between the last symbol of the PDCCH and the first symbol of the first uplink channel is greater than or equal to a first time interval corresponding to a first subcarrier spacing, the first time interval is used to determine whether the first indication information is valid, and the first subcarrier spacing is a smallest value in a subcarrier spacing corresponding to a DMRS corresponding to a PDSCH indicated by the DCI, a subcarrier spacing corresponding to the PDCCH, and a subcarrier spacing corresponding to the first uplink channel; or the first subcarrier spacing is a smallest value in a subcarrier spacing corresponding to a CSI-RS, a subcarrier spacing corresponding to a DMRS corresponding to a PDSCH indicated by the DCI, a subcarrier spacing corresponding to the PDCCH, and a subcarrier spacing corresponding to the first uplink channel.

Figure 10:
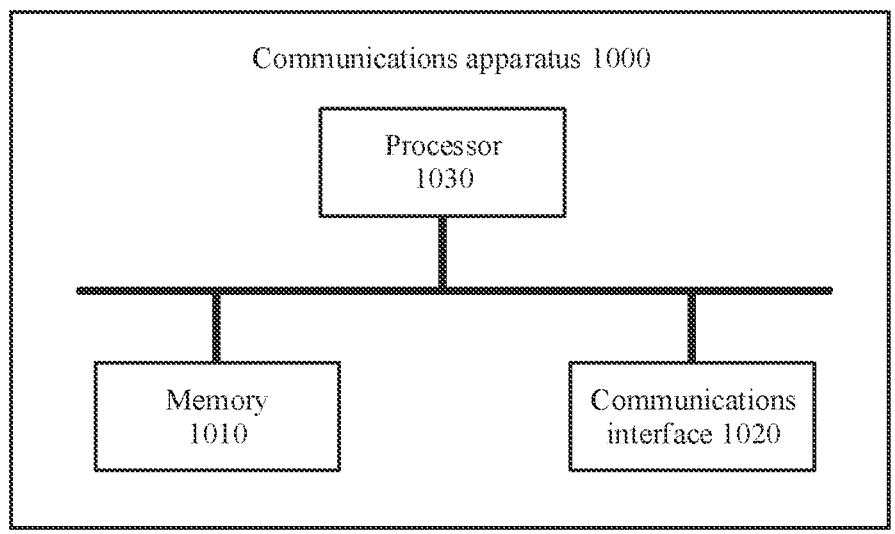
FIG. 10 is a schematic structural diagram of a communications apparatus according to another embodiment of this application.

FIG. 10 is a schematic block diagram of a communications apparatus 1000 according to an embodiment of this application. It should be understood that the communications apparatus 1000 can perform the steps performed by the terminal device in the method in FIG. 2, FIG. 5, or FIG. 6. To avoid repetition, details are not described herein again. The communications apparatus 1000 includes a memory 1010, a communications interface 1020, and a processor 1030.

The memory 1010 is configured to store a program.

The communications interface 1020 is configured to communicate with another device.

The processor 1030 is configured to execute the program in the memory 1010. When the program is executed, the processor 1030 is configured to: receive DCI on a PDCCH through the communications interface 1020, where the DCI includes first indication information, and the first indication information is used to trigger a terminal device to report CSI on a first uplink channel; and determine, based on the DCI and/or higher layer signaling, a first time interval from a plurality of candidate first time intervals corresponding to a first subcarrier spacing, where the first time interval is used to determine whether the first indication information is valid, the first subcarrier spacing is one of the following plurality of subcarrier spacings: a 15 kHz subcarrier spacing, a 30 kHz subcarrier spacing, a 60 kHz subcarrier spacing, and a 120 kHz subcarrier spacing, and a correspondence between the first subcarrier spacing and the first time interval meets at least one of the following conditions: a first time interval corresponding to a 15 kHz subcarrier spacing is less than or equal to eight symbols, a first time interval corresponding to a 30 kHz subcarrier spacing is less than or equal to 12 symbols, a first time interval corresponding to a 60 kHz subcarrier spacing is less than or equal to 24 symbols, and a first time interval corresponding to a 120 kHz subcarrier spacing is less than or equal to 42 symbols.

Alternatively, the processor 1030 is configured to: receive a downlink reference signal through the communications interface 1020, where the downlink reference signal is a measurement resource used to obtain CSI; and determine a second time interval from a plurality of candidate second time intervals corresponding to a first subcarrier spacing, where the second time interval is used to determine whether the CSI is valid or whether the CSI is updated, and a correspondence between the second time interval and the first subcarrier spacing meets at least one of the following conditions a second time interval corresponding to a 15 kHz subcarrier spacing is less than or equal to six symbols, a second time interval corresponding to a 30 kHz subcarrier spacing is less than or equal to 10 symbols, a second time interval corresponding to a 60 kHz subcarrier spacing is less than or equal to 20 symbols, and a second time interval corresponding to a 120 kHz subcarrier spacing is less than or equal to 35 symbols.

Alternatively, the processor 1030 is configured to: receive DCI on a PDCCH through the communications interface 1020, where the DCI includes first indication information, and the first indication information is used to trigger a terminal device to report CSI on a first uplink channel; and send the CSI on the first uplink channel through the communications interface 1020, where a time interval between the last symbol of the PDCCH and the first symbol of the first uplink channel is greater than or equal to a first time interval corresponding to a first subcarrier spacing, the first time interval is used to determine whether the first indication information is valid, and the first subcarrier spacing is a smallest value in a subcarrier spacing corresponding to a DMRS corresponding to a PDSCH indicated by the DCI, a subcarrier spacing corresponding to the PDCCH, and a subcarrier spacing corresponding to the first uplink channel; or the first subcarrier spacing is a smallest value in a subcarrier spacing corresponding to a CSI-RS, a subcarrier spacing corresponding to a DMRS corresponding to a PDSCH indicated by the DCI, a subcarrier spacing corresponding to the PDCCH, and a subcarrier spacing corresponding to the first uplink channel.

It should be understood that the communications apparatus 1000 shown in FIG. 10 may be a chip or a circuit, for example, a chip or a circuit that may be disposed in a terminal device. The communications interface 1020 may alternatively be a transceiver. The transceiver includes a receiver and a transmitter. Further, the communications apparatus 1000 may further include a bus system.

The processor 1030, the memory 1010, the receiver, and the transmitter are connected to each other through the bus system. The processor 1030 is configured to execute an instruction stored in the memory 1010, to control the receiver to receive a signal and control the transmitter to send a signal, and complete the steps performed by the network device in the communications method in this application. The receiver and the transmitter may be a same physical entity or different physical entities. When the receiver and the transmitter are a same physical entity, the receiver and the transmitter may be collectively referred to as a transceiver. The memory 1010 may be integrated in the processor 1030, or may be disposed separately from the processor 1030.

In an implementation, functions of the receiver and the transmitter may be implemented by a transceiver circuit or a dedicated transceiver chip. The processor may be implemented by a dedicated processing chip, a processing circuit, a processor, or a general-purpose chip.

Figure 11:
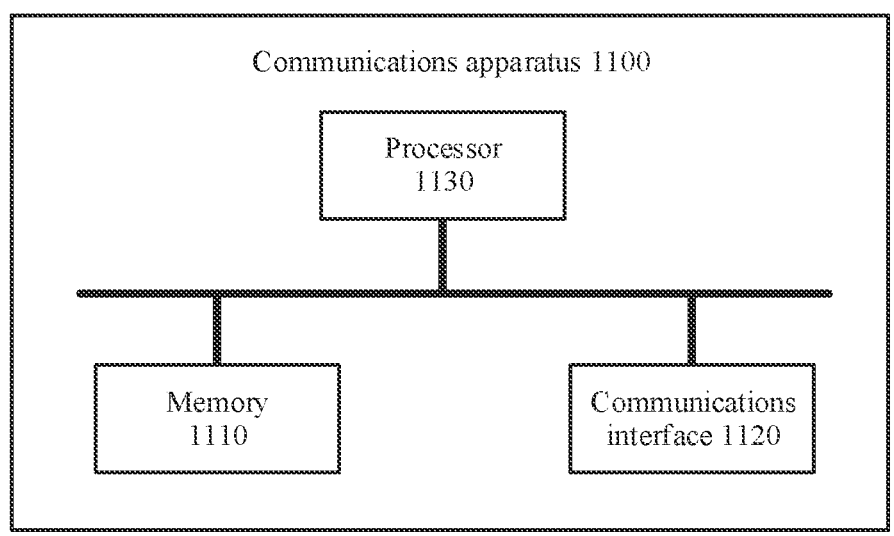
FIG. 11 is a schematic structural diagram of a communications apparatus according to another embodiment of this application.

FIG. 11 is a schematic block diagram of a communications apparatus 1100 according to an embodiment of this application. It should be understood that the communications apparatus 1100 can perform the steps performed by the network device in the method in FIG. 2, FIG. 5, or FIG. 6. To avoid repetition, details are not described herein again. The communications apparatus 1100 includes a memory 1110, a communications interface 1120, and a processor 1130.

The memory 1110 is configured to store a program.

The communications interface 1120 is configured to communicate with another device.

The processor 1130 is configured to execute the program in the memory 1110. When the program is executed, the processor 1130 is configured to: send DCI to a terminal device on a PDCCH through the communications interface 1120, where the DCI includes first indication information, the first indication information is used to trigger the terminal device to report CSI on a first uplink channel, and the DCI and/or higher layer signaling are/is used to indicate to determine a first time interval from a plurality of candidate first time intervals corresponding to a first subcarrier spacing, where the first time interval is used to determine whether the first indication information is valid, the first subcarrier spacing is one of the following plurality of subcarrier spacings: a 15 kHz subcarrier spacing, a 30 kHz subcarrier spacing, a 60 kHz subcarrier spacing, and a 120 kHz subcarrier spacing, and a correspondence between the first subcarrier spacing and the first time interval meets at least one of the following conditions: a first time interval corresponding to a 15 kHz subcarrier spacing is less than or equal to eight symbols, a first time interval corresponding to a 30 kHz subcarrier spacing is less than or equal to 12 symbols, a first time interval corresponding to a 60 kHz subcarrier spacing is less than or equal to 24 symbols, and a first time interval corresponding to a 120 kHz subcarrier spacing is less than or equal to 42 symbols; and receive the CSI from the terminal device on the first uplink channel through the communications interface 1120.

Alternatively, the processor 1130 is configured to send a downlink reference signal to a terminal device through the communications interface 1120, where the downlink reference signal is a measurement resource used to obtain CSI; and receive the CSI on a first uplink channel through the communications interface 1120, where the CSI is sent based on a second time interval corresponding to a first subcarrier spacing, the second time interval is used to determine whether the CSI is valid or whether the CSI is updated, and a correspondence between the second time interval and the first subcarrier spacing meets at least one of the following conditions: a second time interval corresponding to a 15 kHz subcarrier spacing is less than or equal to six symbols, a second time interval corresponding to a 30 kHz subcarrier spacing is less than or equal to 10 symbols, a second time interval corresponding to a 60 kHz subcarrier spacing is less than or equal to 20 symbols, and a second time interval corresponding to a 120 kHz subcarrier spacing is less than or equal to 35 symbols.

Alternatively, the processor 1130 is configured to send DCI on a PDCCH through the communications interface 1120, where the DCI is used to trigger a terminal device to report CSI; and receive the CSI from the terminal device on a first uplink channel through the communications interface 1120, where a time interval between the last symbol of the PDCCH and the first symbol of the first uplink channel is greater than or equal to a first time interval corresponding to a first subcarrier spacing, the first time interval is used to determine whether the first indication information is valid, and the first subcarrier spacing is a smallest value in a subcarrier spacing corresponding to a DMRS corresponding to a PDSCH indicated by the DCI, a subcarrier spacing corresponding to the PDCCH, and a subcarrier spacing corresponding to the first uplink channel; or the first subcarrier spacing is a smallest value in a subcarrier spacing corresponding to a CSI-RS, a subcarrier spacing corresponding to a DMRS corresponding to a PDSCH indicated by the DCI, a subcarrier spacing corresponding to the PDCCH, and a subcarrier spacing corresponding to the first uplink channel.

It should be understood that the communications apparatus 1100 shown in FIG. 11 may be a chip or a circuit, for example, a chip or a circuit that may be disposed in a network device. The communications interface 1120 may alternatively be a transceiver. The transceiver includes a receiver and a transmitter. Further, the communications apparatus 1100 may further include a bus system.

The processor 1130, the memory 1110, the receiver, and the transmitter are connected to each other through the bus system. The processor 1130 is configured to execute an instruction stored in the memory 1110, to control the receiver to receive a signal and control the transmitter to send a signal, and complete the steps performed by the network device in the communications method in this application. The receiver and the transmitter may be a same physical entity or different physical entities. When the receiver and the transmitter are a same physical entity, the receiver and the transmitter may be collectively referred to as a transceiver. The memory 1110 may be integrated in the processor 1130, or may be disposed separately from the processor 1130.

In an implementation, functions of the receiver and the transmitter may be considered to be implemented by a transceiver circuit or a dedicated transceiver chip. The processor may be implemented by a dedicated processing chip, a processing circuit, a processor, or a general-purpose chip.

A person of ordinary skill in the art may be aware that units, algorithms, and steps in the examples described with reference to the embodiments disclosed in this specification can be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that for the purpose of convenient and brief description, for a detailed working process of the described system, apparatus, and unit, refer to a corresponding process in the foregoing method embodiments. Details are not described herein again.

The described apparatus embodiments are merely examples. The unit division is merely logical function division, and there may be other division in actual implementation. For example, a plurality of units or components may be combined or integrated into another system. In addition, the displayed or discussed mutual communication connections may be implemented through some interfaces. The indirect couplings or communication connections between the apparatuses or units may be implemented in electronic, mechanical, or other forms.

In addition, units in the embodiments of this application may be integrated into one processing unit, or each of the units may exist alone physically, or two or more units may be integrated into one unit.

It may be understood that, the processor in the embodiments of this application may be a central processing unit (CPU), or may be another general-purpose processor, a digital signal processor (DSP), an application-specific integrated circuit (ASIC), a field programmable gate array (FPGA) or another programmable logic device, a transistor logic device, a hardware component, or any combination thereof. The general purpose processor may be a microprocessor or any regular processor or the like.

All or some of the methods in the embodiments of this application may be implemented through software, hardware, firmware, or any combination thereof. When software is used to implement the embodiments, all or some of the embodiments may be implemented in a form of a computer program product. The computer program product includes one or more computer programs or instructions. When the computer program or instruction is loaded and executed on a computer, the procedures or functions in the embodiments of this application are all or partially performed. The computer may be a general-purpose computer, a special-purpose computer, a computer network, or another programmable apparatus. The computer program or instruction may be stored in a computer readable storage medium, or may be transmitted by using the computer readable storage medium. The computer readable storage medium may be any usable medium accessible by a computer, or may be a data storage device such as a server integrating one or more usable media. The usable medium may be a magnetic medium, for example, a floppy disk, a hard disk, or a magnetic tape, or may be an optical medium, for example, a CD-ROM or a DVD, or may be a semiconductor medium, for example, a solid state disk (SSD), a random access memory (RAM), a read-only memory (ROM), and a register.

For example, a storage medium is coupled to a processor, so that the processor can read information from the storage medium or write information into the storage medium. Certainly, the storage medium may be a component of the processor. The processor and the storage medium may be located in an ASIC. In addition, the ASIC may be located in a network device or a terminal device. Certainly, the processor and the storage medium may exist in a sending device or a receiving device as discrete components.

In the embodiments of this application, unless otherwise stated or there is a logic conflict, terms and/or descriptions between different embodiments are consistent and may be mutually referenced, and technical features in different embodiments may be combined based on an internal logical relationship thereof, to form a new embodiment.

In this application, the term "and/or" describes an association relationship between associated objects and may indicate three relationships. For example. A and/or B may indicate the following cases: Only A exists, both A and B exist, and only B exists, where A and B may be singular or plural. In the text descriptions of this application, the character "/" indicates an "or" relationship between the associated objects. In a formula in this application, the character "/" indicates a "division" relationship between the associated objects.

It may be understood that numerical symbols used in the embodiments of this application are differentiated merely for ease of description, but are not used to limit the scope of the embodiments of this application. Sequence numbers of the foregoing processes do not mean execution sequences, and the execution sequences of the processes should be determined based on functions and internal logic of the processes.

What is claimed is:

1. A channel state information (CSI) reporting method, comprising:
receiving downlink control information (DCI) on a physical downlink control channel (PDCCH), wherein the DCI comprises first indication information, and wherein the first indication information is used to trigger a terminal device to report CSI on a first uplink channel; and
determining, based on at least one of the DCI or higher layer signaling, a first time interval from a plurality of candidate first time intervals corresponding to a first subcarrier spacing, wherein the first time interval is used to determine whether the first indication information is valid, wherein the first subcarrier spacing is one of a 15 kilohertz (kHz) subcarrier spacing, a 30 kHz subcarrier spacing, a 60 kHz subcarrier spacing, and a 120 kHz subcarrier spacing, and wherein a correspondence between the first subcarrier spacing and the first time interval meets at least one of the following conditions: a first time interval corresponding to the 15 kHz subcarrier spacing is less than or equal to eight symbols, a first time interval corresponding to the 30 kHz subcarrier spacing is less than or equal to 12 symbols, a first time interval corresponding to the 60 kHz subcarrier spacing is less than or equal to 24 symbols, and a first time interval corresponding to the 120 kHz subcarrier spacing is less than or equal to 42 symbols.

2. The method according to claim 1, wherein the method further comprises:
when a time interval between the last symbol of the PDCCH and the first symbol of the first uplink channel is greater than or equal to the first time interval, determining that the first indication information is valid; or
when a time interval between the last symbol of the PDCCH and the first symbol of the first uplink channel is less than the first time interval, determining that the first indication information is invalid.

3. The method according to claim 1, wherein the first time interval meets the following condition:
the first time interval is less than or equal to a time interval between the last symbol of a physical downlink shared channel (PDSCH) indicated by the DCI and the first symbol of a second uplink channel, wherein the second uplink channel is used to carry hybrid automatic repeat request (HARQ) feedback information corresponding to the PDSCH indicated by the DCI.

4. The method according to claim 3, wherein:
the first subcarrier spacing is a smallest value among a subcarrier spacing corresponding to a demodulation reference signal (DMRS) corresponding to the PDSCH indicated by the DCI, a subcarrier spacing corresponding to the PDCCH, and a subcarrier spacing corresponding to the first uplink channel; or
the first subcarrier spacing is a smallest value among a subcarrier spacing corresponding to a channel state information reference signal (CSI-RS), a subcarrier spacing corresponding to a DMRS corresponding to the PDSCH indicated by the DCI, a subcarrier spacing corresponding to the PDCCH, and a subcarrier spacing corresponding to the first uplink channel.

5. The method according to claim 3, wherein determining, based on at least one of the DC or the higher layer signaling, the first time interval from the plurality of candidate first time intervals corresponding to the first subcarrier spacing comprises:
determining the first time interval when at least one of the following conditions is met:
a time interval between a slot in which the PDSCH indicated by the DCI is located and a slot in which the HARQ feedback information is located is less than or equal to a first threshold;
a time length of a time domain resource of the PDSCH indicated by the DCI is less than or equal to a second threshold; and
a time length of a time domain resource of the first uplink channel indicated by the DCI is less than or equal to a third threshold.

6. The method according to claim 1, wherein determining, based on at least one of the DCI or the higher layer signaling, the first time interval from the plurality of candidate first time intervals corresponding to the first subcarrier spacing comprises:
determining the first time interval when a radio network temporary identifier (RNTI) used to scramble the DCI is a first RNTI, wherein modulation and coding scheme (MCS) information in the DC scrambled by using the first RNTI corresponds to a first MCS table, and wherein the first MCS table comprises MCS information whose spectral efficiency is 0.0586.

7. An apparatus comprising:
one or more processors; and
a non-transitory computer readable medium storing programming instructions for execution by the one or more processors, the programming instructions instructing the apparatus to perform operations comprising:
sending downlink control information (DCI) to a terminal device on a physical downlink control channel (PDCCH), wherein the DCI comprises first indication information, wherein the first indication information is used to trigger the terminal device to report channel state information (CSI) on a first uplink channel, wherein at least one of the DCI or higher layer signaling is used to determine a first time interval from a plurality of candidate first time intervals corresponding to a first subcarrier spacing, wherein the first time interval is used to determine whether the first indication information is valid, wherein the first subcarrier spacing is one of a 15 kilohertz (kHz) subcarrier spacing, a 30 kHz subcarrier spacing, a 60 kHz subcarrier spacing, and a 120 kHz subcarrier spacing, and wherein a correspondence between the first subcarrier spacing and the first time interval meets at least one of the following conditions: a first time interval corresponding to the 15 kHz subcarrier spacing is less than or equal to eight symbols, a first time interval corresponding to the 30 kHz subcarrier spacing is less than or equal to 12 symbols, a first time interval corresponding to the 60 kHz subcarrier spacing is less than or equal to 24 symbols, and a first time interval corresponding to the 120 kHz subcarrier spacing is less than or equal to 42 symbols; and
receiving the CSI from the terminal device on the first uplink channel.

8. The apparatus according to claim 7, wherein:
when a time interval between the last symbol of the PDCCH and the first symbol of the first uplink channel is greater than or equal to the first time interval, the first indication information is valid; or when a time interval between the last symbol of the PDCCH and the first symbol of the first uplink channel is less than the first time interval, the first indication information is invalid.

9. The apparatus according to claim 7, wherein the operations further comprise sending the higher layer signaling.

10. The apparatus according to claim 7, wherein the first time interval meets the following condition:
the first time interval is less than or equal to a time interval between the last symbol of a physical downlink shared channel (PDSCH) indicated by the DCI and the first symbol of a second uplink channel, wherein the second uplink channel is used to carry hybrid automatic repeat request (HARQ) feedback information corresponding to the PDSCH indicated by the DCI.

11. The apparatus according to claim 10, wherein:
the first subcarrier spacing is a smallest value among a subcarrier spacing corresponding to a demodulation reference signal (DMRS) corresponding to the PDSCH indicated by the DCI, a subcarrier spacing corresponding to the PDCCH, and a subcarrier spacing corresponding to the first uplink channel; or
the first subcarrier spacing is a smallest value among a subcarrier spacing corresponding to a channel state information reference signal (CSI-RS), a subcarrier spacing corresponding to a DMRS corresponding to the PDSCH indicated by the DCI, a subcarrier spacing corresponding to the PDCCH, and a subcarrier spacing corresponding to the first uplink channel.

12. The apparatus according to claim 7, wherein the operations further comprise scrambling the DCI by using a first radio network temporary identifier (RNTI), wherein the first RNTI corresponds to the first time interval, wherein modulation and coding scheme (MCS) information in the DCI scrambled by using the first RNTI corresponds to a first MCS table, and wherein the first MCS table comprises MCS information whose spectral efficiency is 0.0586.

13. An apparatus comprising:
one or more processors; and
a non-transitory computer readable medium storing programming instructions for execution by the one or more processors, the programming instructions instructing the apparatus to perform operations comprising:
receiving downlink control information (DCI) on a physical downlink control channel (PDCCH), wherein the DCI comprises first indication information, and wherein the first indication information is used to trigger a terminal device to report CSI on a first uplink channel; and
determining, based on at least one of the DC or higher layer signaling, a first time interval from a plurality of candidate first time intervals corresponding to a first subcarrier spacing, wherein the first time interval is used to determine whether the first indication information is valid, wherein the first subcarrier spacing is one of a 15 kilohertz (kHz) subcarrier spacing, a 30 kHz subcarrier spacing, a 60 kHz subcarrier spacing, and a 120 kHz subcarrier spacing, and wherein a correspondence between the first subcarrier spacing and the first time interval meets at least one of the following conditions: a first time interval corresponding to the 15 kHz subcarrier spacing is less than or equal to eight symbols, a first time interval corresponding to the 30 kHz subcarrier spacing is less than or equal to 12 symbols, a first time interval corresponding to the 60 kHz subcarrier spacing is less than or equal to 24 symbols, and a first time interval corresponding to the 120 kHz subcarrier spacing is less than or equal to 42 symbols.

14. The apparatus according to claim 13, wherein the operations further comprise:
when a time interval between the last symbol of the PDCCH and the first symbol of the first uplink channel is greater than or equal to the first time interval, determining that the first indication information is valid; or
when a time interval between the last symbol of the PDCCH and the first symbol of the first uplink channel is less than the first time interval, determining that the first indication information is invalid.

15. The apparatus according to claim 13, wherein the first time interval meets the following condition:
the first time interval is less than or equal to a time interval between the last symbol of a physical downlink shared channel (PDSCH) indicated by the DCI and the first symbol of a second uplink channel, wherein the second uplink channel is used to carry hybrid automatic repeat request (HARQ) feedback information corresponding to the PDSCH indicated by the DCI.

16. The apparatus according to claim 15, wherein:
the first subcarrier spacing is a smallest value among a subcarrier spacing corresponding to a demodulation reference signal (DMRS) corresponding to the PDSCH indicated by the DCI, a subcarrier spacing corresponding to the PDCCH, and a subcarrier spacing corresponding to the first uplink channel; or
the first subcarrier spacing is a smallest value among a subcarrier spacing corresponding to a channel state information reference signal (CSI-RS), a subcarrier spacing corresponding to a DMRS corresponding to the PDSCH indicated by the DCI, a subcarrier spacing corresponding to the PDCCH, and a subcarrier spacing corresponding to the first uplink channel.

17. The apparatus according to claim 15, wherein determining, based on at least one of the DCI or the higher layer signaling, the first time interval from the plurality of candidate first time intervals corresponding to the first subcarrier spacing comprises:
determining the first time interval when at least one of the following conditions is met:
a time interval between a slot in which the PDSCH indicated by the DCI is located and a slot in which the HARQ feedback information is located is less than or equal to a first threshold;
a time length of a time domain resource of the PDSCH indicated by the DCI is less than or equal to a second threshold; and
a time length of a time domain resource of the first uplink channel indicated by the DCI is less than or equal to a third threshold.

18. The apparatus according to claim 13, wherein determining, based on at least one of the DCI or the higher layer signaling, the first time interval from the plurality of candidate first time intervals corresponding to the first subcarrier spacing comprises:

determining the first time interval when a radio network temporary identifier (RNTI) used to scramble the DCI is a first RNTI, wherein modulation and coding scheme (MCS) information in the DCI scrambled by using the first RNTI corresponds to a first MCS table, and wherein the first MCS table comprises MCS information whose spectral efficiency is 0.0586.

* * * * *

UNITED STATES PATENT AND TRADEMARK OFFICE
CERTIFICATE OF CORRECTION

PATENT NO. : 11,777,575 B2
APPLICATION NO. : 17/170391
DATED : October 3, 2023
INVENTOR(S) : Jiafeng Shao and Yongxia Lyu It is certified that error appears in the above-identified patent and that said Letters Patent is hereby corrected as shown below:

In the Claims

Column 45, Line 67, Claim 5, please delete "DC" and insert therefore -- DCI --;

Column 46, Line 24, Claim 6, please delete "DC" and insert therefore -- DCI --;

Column 47, Line 51, Claim 13, please delete "DC" and insert therefore -- DCI --.

Signed and Sealed this
Thirtieth Day of April, 2024

Katherine Kelly Vidal
*Director of the United States Patent and Trademark Office*